US006812317B2

(12) United States Patent
Dalton et al.

(10) Patent No.: US 6,812,317 B2
(45) Date of Patent: Nov. 2, 2004

(54) WOUND GOLF BALL HAVING CAST POLYURETHANE COVER

(75) Inventors: Jeffrey L. Dalton, Dartmouth, MA (US); Herbert C. Boehm, Norwell, MA (US); Edmund A. Hebert, Fairhaven, MA (US); William E. Morgan, Barrington, RI (US); Christopher Cavallaro, Lakeville, MA (US); Roman D. Halko, Mansfield, MA (US)

(73) Assignee: Acushnet Company, Fairhaven, MA (US)

( * ) Notice: Subject to any disclaimer, the term of this patent is extended or adjusted under 35 U.S.C. 154(b) by 656 days.

(21) Appl. No.: 09/775,793

(22) Filed: Feb. 5, 2001

(65) Prior Publication Data

US 2002/0006837 A1 Jan. 17, 2002

Related U.S. Application Data

(60) Continuation-in-part of application No. 09/625,544, filed on Jul. 25, 2000, now Pat. No. 6,749,789, which is a continuation of application No. 09/207,690, filed on Dec. 9, 1998, now Pat. No. 6,132,324, which is a division of application No. 08/863,788, filed on May 27, 1997, now Pat. No. 5,885,172.

(51) Int. Cl.$^7$ ............................ A63B 37/12; A63B 37/06

(52) U.S. Cl. ............................ 528/61; 528/65; 525/261; 525/264; 473/357; 473/360; 473/365

(58) Field of Search ................................ 525/261, 264; 528/61, 65; 473/357, 360, 365

(56) References Cited

U.S. PATENT DOCUMENTS

| | | | |
|---|---|---|---|
| 697,925 A | 4/1902 | Kempshall | |
| 700,658 A | 5/1902 | Kempshall | 473/374 |
| 704,748 A | 7/1902 | Kempshall | 473/374 |
| 720,852 A | 2/1903 | Smith | 473/374 |
| 1,558,706 A | 10/1925 | Mitzel | |
| 2,229,170 A | 1/1941 | Greene | 273/62 |
| 2,376,085 A | 5/1945 | Radford et al. | 18/30 |
| 3,147,324 A | 9/1964 | Ward | 364/254 |
| 3,177,280 A | 4/1965 | Ford et al. | 264/275 |
| 3,239,228 A | 3/1966 | Crompton, III | 273/218 |
| 3,262,272 A | 7/1966 | Barakauskas et al. | 60/39.05 |
| 3,572,721 A | 3/1971 | Harrison et al. | 372/218 |
| 3,572,722 A | 3/1971 | Harrison et al. | 273/218 |
| 3,615,101 A | 10/1971 | Satchell et al. | 161/7 |
| 3,940,145 A | 2/1976 | Gentiluomo | 273/218 |
| 3,989,568 A | 11/1976 | Isaac | 156/182 |
| 3,992,014 A | 11/1976 | Retford | 273/218 |
| 4,123,061 A | 10/1978 | Dusbiber | 273/220 |
| 4,173,345 A | 11/1979 | Pocklington | 273/217 |
| 4,203,941 A | 5/1980 | Brooker | 264/250 |
| 4,229,401 A | 10/1980 | Pocklington | 264/248 |
| 4,274,637 A | 6/1981 | Molitor | 273/235 R |
| 4,367,873 A | 1/1983 | Chang et al. | |
| 4,429,068 A | 1/1984 | Nakahira | 524/302 |
| 4,431,193 A | 2/1984 | Nesbitt | 273/235 R |
| 4,473,229 A | 9/1984 | Kloppenburg et al. | 273/225 |
| 4,530,386 A | 7/1985 | Nakahira | 152/315 |
| 4,625,964 A | 12/1986 | Yamada | 273/62 |
| 4,692,497 A | 9/1987 | Gendreau et al. | 525/263 |
| 4,714,253 A | 12/1987 | Nakahara et al. | 273/228 |
| 4,848,770 A | 7/1989 | Shama | 273/228 |
| 4,919,434 A | 4/1990 | Saito | 273/235 R |
| 4,931,376 A | 6/1990 | Ikematsu et al. | 525/164 |
| 4,959,000 A | 9/1990 | Giza | 425/116 |
| 4,971,329 A | 11/1990 | Llort et al. | 273/218 |
| 5,002,281 A | 3/1991 | Nakahara et al. | 273/220 |
| 5,006,288 A | 4/1991 | Rhodes et al. | 264/46.6 |
| 5,006,297 A | 4/1991 | Brown et al. | 264/234 |
| 5,037,104 A | 8/1991 | Watanabe et al. | 273/35 |
| 5,072,944 A | 12/1991 | Nakahara et al. | 273/220 |
| 5,112,556 A | 5/1992 | Miller | 264/279 |
| 5,252,652 A | 10/1993 | Egashira et al. | 524/392 |
| 5,253,871 A | 10/1993 | Viollaz | 273/228 |
| 5,314,187 A | 5/1994 | Proudfit | 273/235 R |
| 5,334,673 A | 8/1994 | Wu | 273/235 R |
| 5,415,937 A | 5/1995 | Cadorniga et al. | 473/385 X |
| 5,421,580 A | 6/1995 | Sugimoto et al. | 273/227 |
| 5,553,852 A | 9/1996 | Higuchi et al. | 473/373 |
| 5,574,107 A | 11/1996 | Hiraoka et al. | 473/378 |
| 5,586,950 A | 12/1996 | Endo | 473/378 |
| 5,609,535 A | 3/1997 | Morgan | 473/378 X |
| 5,628,699 A | 5/1997 | Maruko et al. | 473/363 |

(List continued on next page.)

FOREIGN PATENT DOCUMENTS

| | | |
|---|---|---|
| EP | 0 577 058 A1 | 1/1994 |
| GB | 1 168 609 | 10/1969 |
| GB | 1 209 032 | 10/1970 |
| GB | 2278609 | 7/1994 |
| GB | 2291817 | 1/1996 |
| GB | 2291811 | 7/1996 |
| GB | 2291812 | 7/1996 |
| GB | 2 321 021 A | 3/1997 |
| WO | WO 98/37929 | 9/1998 |
| WO | WO-00/38794 | * 7/2000 |
| WO | WO 00/57962 | 10/2000 |

*Primary Examiner*—David J. Buttner
(74) *Attorney, Agent, or Firm*—Swidler Berlin Shereff Friedman, LLP

(57) ABSTRACT

A golf ball and a method of making a golf ball that includes a center formed from a material including polybutadiene and having a high resilience, at least one cover layer formed of a material including polyurethane, and at least one wound layer of a tensioned material windings between the center and the cover. The polyurethane composition is formed from the reaction product of at least a prepolymer of a polyisocyanate and a polyol, and a diamine curing agent. The polybutadiene composition includes a butadiene polymer with a resilience index greater than about 40 and a weight average molecular weight greater than about 200,000. Such golf balls can have a coefficient of restitution that is optimized for low swing speed players. The wound layer of the present invention may be applied to golf balls having liquid or solid centers to achieve desired golf ball characteristics.

10 Claims, 4 Drawing Sheets

U.S. PATENT DOCUMENTS

| | | | |
|---|---|---|---|
| 5,663,235 A | 9/1997 | Tanaka | 525/201 |
| 5,668,191 A | 9/1997 | Kinkelaar et al. | 521/174 |
| 5,692,973 A | 12/1997 | Dalton | 473/374 |
| 5,692,974 A | 12/1997 | Wu et al. | 473/377 |
| 5,697,856 A | 12/1997 | Moriyama et al. | 473/374 |
| 5,704,852 A | 1/1998 | Kato et al. | 473/357 |
| 5,713,801 A | 2/1998 | Aoyama | 473/354 |
| 5,713,802 A | 2/1998 | Moriyama et al. | 473/374 |
| 5,730,663 A | 3/1998 | Tanaka et al. | 473/373 |
| 5,730,664 A | 3/1998 | Asakura et al. | 473/373 |
| 5,733,428 A | 3/1998 | Calabria et al. | 264/134 |
| 5,749,796 A | 5/1998 | Shimosaka et al. | 473/365 |
| 5,759,676 A | 6/1998 | Cavallaro et al. | 428/215 |
| 5,762,568 A | 6/1998 | Kato | 473/365 |
| 5,766,096 A | 6/1998 | Maruko et al. | 473/365 |
| 5,772,530 A | 6/1998 | Kato | 473/363 |
| 5,776,013 A | 7/1998 | Yokota et al. | 473/377 |
| 5,779,561 A | 7/1998 | Sullivan et al. | 473/373 |
| 5,779,562 A | 7/1998 | Melvin et al. | 473/373 |
| 5,792,008 A | 8/1998 | Kakiuchi et al. | 473/354 |
| 5,797,808 A | 8/1998 | Hayashi et al. | 473/364 |
| 5,800,286 A | 9/1998 | Kakiuchi et al. | 473/365 |
| 5,810,678 A | 9/1998 | Cavallaro et al. | 473/373 |
| 5,813,923 A | 9/1998 | Cavallaro | 473/373 |
| 5,816,939 A | 10/1998 | Hamada et al. | 473/357 |
| 5,816,944 A | 10/1998 | Asakura et al. | 473/372 |
| 5,820,485 A | 10/1998 | Hwang | 473/361 |
| 5,820,486 A | 10/1998 | Tanaka et al. | 473/374 |
| 5,820,488 A | 10/1998 | Sullivan et al. | 473/374 |
| 5,836,833 A | 11/1998 | Shimosaka et al. | 473/365 |
| 5,836,834 A | 11/1998 | Masutani et al. | 473/374 |
| 5,885,172 A | 3/1999 | Hebert et al. | 473/354 |
| 5,899,822 A | 5/1999 | Yamagishi et al. | 473/374 |
| 5,919,100 A | 7/1999 | Buchm et al. | 473/354 |
| 5,976,035 A | 11/1999 | Umezawa et al. | 473/364 |
| 5,981,684 A | 11/1999 | Bruchmann et al. | 528/45 |
| 5,984,807 A | 11/1999 | Wai et al. | 473/376 |
| 6,001,930 A | 12/1999 | Rajagopalan | 525/92 |
| 6,057,403 A | 5/2000 | Sullivan et al. | 525/221 |
| 6,117,025 A | 9/2000 | Sullivan | 473/373 |
| 6,126,559 A | 10/2000 | Sullivan et al. | 473/378 |
| 6,130,295 A | 10/2000 | Yokota | 525/221 |
| 6,132,324 A | 10/2000 | Hebert et al. | 473/378 |
| 6,149,535 A | 11/2000 | Bissonnette et al. | 473/354 |
| 6,152,834 A | 11/2000 | Sullivan | 473/365 |
| 6,190,268 B1 * | 2/2001 | Dewanjee | 473/370 |
| 6,315,679 B1 * | 11/2001 | Sano | 473/357 |
| 6,486,261 B1 * | 11/2002 | Wu et al. | 525/332.6 |

* cited by examiner

WOUND GOLF BALL HAVING CAST POLYURETHANE COVER

CROSS-REFERENCE TO RELATED APPLICATIONS

This application is a continuation-in-part of application Ser. No. 09/625,544, filed Jul. 25, 2000, now U.S. Pat. No. 6,749,789, which is a continuation of application Ser. No. 09/207,690, filed Dec. 9, 1998, now, U.S. Pat. No. 6,132,324, which is a divisional of application Ser. No. 08/863,788, filed May 27, 1997, now U.S. Pat. No. 5,885,172.

FIELD OF THE INVENTION

This invention relates generally to golf balls, and more specifically, to a wound golf ball having at least a center, a cover and a wound layer disposed therebetween having at least one thread. The cover can be formed of a polymer blend including a polyurethane composition and the core can include a polybutadiene composition. The golf balls of the present invention can provide improved velocity and a high resilience for low swing speed players to increase flight distance.

BACKGROUND OF THE INVENTION

Conventional golf balls can be divided into two general groups: solid balls or wound balls. The difference in play characteristics resulting from these different types of construction can be quite significant. Balls having a solid construction are popular with golfers because they provide a very durable ball while also providing maximum distance. Solid balls are generally made with a solid core, usually made of a cross linked rubber, enclosed by a cover material. Typically the solid core is made of polybutadiene which is chemically crosslinked with zinc diacrylate and/or similar crosslinking agents. In addition to one-piece solid cores, solid cores may also contain a number of outer layers, such as in a dual core golf ball. The cover is generally an ionomeric material, such as SURLYN®, which is a tradename for a family of ionomer resins produced by E.I. DuPont de Nemours & Co. of Wilmington, Del. Covers are typically a single layer but may also include one or more layers, such as in a double cover having an inner and outer cover layer.

The combination of the solid core and ionomeric cover materials provide a ball that is very durable and abrasion resistant. Further, such a combination tends to impart a high initial velocity to the ball, which results in increased distance. Because these materials are very rigid, however, solid balls can have a hard "feel" when struck with a club. Likewise, due to their construction, these balls tend to have a relatively low spin rate, which can provide greater distance and increases accuracy off the tee.

At the present time, wound golf balls are preferred by some golfers for the spin and feel characteristics afforded by such a construction. Wound balls typically have either a spherical solid rubber or liquid center, around which many yards of a tensioned elastomeric thread are wound. The wound core is then covered with a durable cover material, such as SURLYN® or similar material, or a softer cover material, such as balata or polyurethane. Wound balls are generally softer and provide more spin, which enable a skilled golfer to have more control over the ball's flight and landing position. Particularly, with approach shots onto the green, the high spin rate of soft, wound balls enable the golfer to stop the ball very near its landing position.

To make wound golf balls, manufacturers use winding machines to stretch the elastic threads to various degrees of elongation during the winding process without subjecting the threads to unnecessary incidents of breakage. Generally, as the elongation and the winding tension increases, the compression and initial velocity of the ball increases. Thus, a more resilient wound ball is produced, which is desirable.

For wound golf balls, the thread is typically formed by a calendar and slitting method rather than an extrusion method. The calendared thread typically has a rectangular cross-section, while extruded thread generally has a circular cross-section.

A number of different windings have been disclosed for use in golf balls. U.S. Pat. No. 4,473,229 to Kloppenburg et al. discloses a golf ball having a core formed of graphite fibers and windings made of graphite filaments and resins. Yarns are made with the graphite filaments and resins, and as many as four or more yarns are combined to form a final yarn used for winding. U.S. Pat. No. 5,713,801 to Aoyama discloses use of a layer of high tensile elastic modulus fibers wound about the core. The fibers have a tensile elastic modulus of at least 10,000 ksi (10,000,000 psi). Also, U.S. Pat. No. 5,816,939 to Hamada et al. discloses a rubber thread for winding with a tensile strength retention of at least 70%, a hysteresis loss of no more than 50%, and an elongation of 900 to 1400%.

Prior art wound golf balls and cores typically use polyisoprene rubber thread wound onto the cores at elongations of between 500 to 1000%. The amount of thread required for a golf ball core is dependent on the elastic modulus of the thread in the elongated state. Elongated polyisoprene thread generally has an elastic modulus of 10,000 psi to 20,000 psi. Further, the properties, in particular resilience, of the wound ball or core are dependent on how well the thread packs during winding. The dimensions of the thread and winding pattern control the packing density. Present art polyisoprene threads are typically at least $\frac{1}{16}$ inches wide by 0.02 inches thick, measured prior to winding. Present art polyisoprene thread, however, is commonly produced in thicknesses between 0.014 inches and 0.024.

U.S. Pat. No. 6,149,535 discloses a thread for winding having at least about 10 individual strands that are each at most about 0.01 inches in diameter. Preferably, the thread has more than 25 strands with diameters of less than about 0.002 inches. The smaller thread dimension allows the thread to be wound more densely. Preferably, the elastic modulus of the thread is greater than 20 ksi when wound about a center. Preferably, the maximum elongation of the thread is greater than about 8%.

A variety of golf balls have been designed by manufacturers to provide a wide range of playing characteristics, such as compression, velocity, "feel," and spin. In addition to ionomers, one of the most common polymers employed is polybutadiene and, more specifically, polybutadiene having a high cis-isomer concentration.

The use of a polybutadiene having a high cis-concentration results in a very resilient and rigid golf ball, especially when coupled with a hard cover material. These highly resilient golf balls have a relatively hard "feel" when struck by a club. Soft "feel" golf balls constructed with a high cis-polybutadiene may also be constructed, however, they tend to have low resilience. In an effort to provide improved golf balls, various other polybutadiene formulations have been prepared, as discussed below.

U.S. Pat. No. 3,239,228 discloses a solid golf ball having a core molded of polybutadiene rubber with a high sulfur content, and a cover. The polybutadiene content of the core is stereo-controlled to the configuration 25–100 percent cis- and 0–65 percent trans-1,4-polybutadiene, with any remainder having a vinyl configuration of polybutadiene. A preferred embodiment of the polybutadiene golf ball core contains 35 percent cis-, 52 percent trans-, and 13 percent vinyl-polybutadiene. The level of trans- and vinyl-content are disclosed to be unimportant to the overall playing characteristics of the polymer blend.

British Patent No. 1,168,609 discloses a molding composition from which improved golf ball cores can be molded and which contains cis-polybutadiene as a basic polymer component. The core polymer component typically includes at least 60 percent cis-polybutadiene, with the remainder being either the trans- or vinyl-forms of polybutadiene. In a preferred embodiment, the core polybutadiene component contains 90 percent cis-configuration, with the remaining 10 percent being either the trans- or vinyl-configurations of 1,4-polybutadiene.

U.S. Pat. Nos. 3,572,721 and 3,572,722 disclose a solid, one- or two-piece golf ball, with the two-piece ball having a core and a cover. The cover material can include any one of a number of materials, or blends thereof, known to those of ordinary skill in the art, including trans-polybutadiene which may be present in an amount from at least 90 percent, with the remainder being the cis- and/or vinyl configuration.

British Pat. No. 1,209,032 discloses a two- or three-piece golf ball having a core and a cover. The core or cover material can be any material capable of being crosslinked. In particular, the material can be a polymer or a copolymer of butadiene or isoprene. Preferably, the polymer component is polybutadiene having a cis content of greater than 50 percent by weight.

U.S. Pat. No. 3,992,014 discloses a one-piece, solid golf ball. The golf ball material is typically polybutadiene, with a stereo-configuration selected to be at least 60 percent cis-polybutadiene, with the remaining 40 percent being the trans-polybutadiene and/or 1,2-polybutadiene (vinyl) isomers.

U.S. Pat. No. 4,692,497 discloses a golf ball and material thereof formed by curing a diene polymer including polybutadiene and a metal salt of an α,β-ethylenically unsaturated acid using at least two free radical initiators.

U.S. Pat. No. 4,931,376 discloses a process for producing butadiene polymers for use in various applications, including golf ball cover materials. One embodiment of the invention employs a blended polymeric resin material, including at least 30 percent by weight of a trans-polybutadiene polymer as a golf ball cover on a two-piece ball. In a preferred embodiment, the golf ball cover material contains a blend including 30 to 90 percent by weight of a trans-polybutadiene polymer.

U.S. Pat. No. 4,971,329 discloses a solid golf ball made from a polybutadiene admixture of cis-1,4 polybutadiene and 1,2 polybutadiene, a metal salt of an unsaturated carboxylic acid, an inorganic filler, and a free radical initiator. The admixture has about 99.5 percent to about 95 percent by weight of cis-1,4 polybutadiene and about 0.5 percent to about 5 percent by weight of 1,2 polybutadiene.

U.S. Pat. No. 5,252,652 discloses a one-piece or multi-layered golf ball core with improved flying performance from a rubber composition comprising a base rubber, preferably 1,4-polybutadiene with a cis-content of at least 40 mole percent, an unsaturated carboxylic acid metal salt, an organic peroxide, and an organic sulfur compound and/or a metal salt thereof. The organic sulfur compound and/or a metal salt is typically present in an amount from about 0.05 to 2 parts per hundred by weight and the organic peroxide is typically present in an amount from about 0.5 to 3 parts per hundred by weight of the total polymer component.

European Patent No. 0 577 058 discloses a golf ball containing a core and a cover that is formed as two separate layers. The inner layer of the cover is molded over the core and is formed from ionomer resin. The outer layer of the cover is molded over the inner layer and is formed from a blend of natural or synthetic balata and a crosslinkable elastomer, such as polybutadiene. In one embodiment of the outer layer of the cover, the elastomer is 1,4-polybutadiene having a cis-structure of at least 40 percent, with the remaining 60 percent being the trans-isomer. A preferred embodiment contains a cis-structure of at least 90 percent and more preferably, a cis-structure of at least 95 percent.

U.S. Pat. No. 5,421,580 discloses a wound golf ball having a liquid center contained in a center bag, a rubber thread layer formed on the liquid center, and a cover over the wound layer and liquid center. The cover material can include any one of a number of materials, or blends thereof, known to those of ordinary skill in the art, including trans-polybutadiene and/or 1,2-polybutadiene (vinyl), such that the cover has a JIS-C hardness of 70–85; preferred trans-percentages are not disclosed.

U.S. Pat. No. 5,697,856 discloses a solid golf ball having a core and a cover wherein the core is produced by vulcanizing a base rubber composition containing a butadiene rubber having a cis-polybutadiene structure content of not less than 90 percent before vulcanization. The amount of trans-polybutadiene structure present after vulcanization is 10 to 30 percent, as amounts over 30 percent are alleged to detrimentally result in cores that are too soft with deteriorated resilience performance, and to cause a decrease in golf ball performance. The core includes a vulcanizing agent, a filler, an organic peroxide, and an organosulfur compound.

British Patent No. 2,321,021 discloses a solid golf ball having a core and a cover formed on the core and having a two-layered cover construction having an inner cover layer and an outer cover layer. The outer cover layer is comprised of a rubber composite that contains 0.05 to 5 parts by weight of an organic sulfide compound. The core rubber composition comprises a base rubber, preferably 1,4-polybutadiene having a cis-content of at least 40 percent by weight, a crosslinking agent, a co-crosslinking agent, an organic sulfide, and a filler. The crosslinking agent is typically an organic peroxide present in an amount from 0.3 to 5.0 parts by weight and the co-crosslinking agent is typically a metal salt of an unsaturated fatty acid present in an amount from 10 to 40 parts by weight. The organic sulfide compound is typically present from 0.05 to 5 parts by weight.

U.S. Pat. No. 5,816,944 discloses a solid golf ball having a core and a cover wherein the core has a JIS-C hardness of 50 to 80 and the cover has a Shore-D hardness of 50 to 60. The core material includes vulcanized rubber, such as cis-polybutadiene, with a crosslinker, an organic peroxide, an organosulfur compound and/or a metal-containing organosulfur compound, and a filler.

Additionally, conventional polymers that have a high percentage of the trans-polybutadiene conformation, such as DIENE 35NF, from Firestone Corp., that has 40 percent cis-isomer and 50 percent trans-polybutadiene isomer, and mixtures of high-cis- and high-trans-polybutadiene isomers, such as CARIFLEX BR1220, from Shell Corporation, and FUREN 88, from Asahi Chemical Co., respectively, typically do not yield high resilience values and therefore are not desirable.

The most common polymers used by manufacturers to modify the properties of golf ball layers and/or covers have been ionomers, such as SURLYN, commercially available from E.I. DuPont de Nemours and Co., of Wilmington, Del. Recently, however, manufacturers have investigated the used of alternative polymers, such as polyurethane. For example, U.S. Pat. No. 3,147,324 is directed to a method of making a golf ball having a polyurethane cover.

Polyurethanes have been recognized as useful materials for golf ball covers since about 1960. Polyurethane compositions are the product of a reaction between a curing agent and a polyurethane prepolymer, which is itself a product formed by a reaction between a polyol and a diisocyanate. The curing agents used previously are typically diamines or glycols. A catalyst is often employed to promote the reaction between the curing agent and the polyurethane prepolymer.

Since 1960, various companies have investigated the usefulness of polyurethane as a golf ball cover material. U.S. Pat. No. 4,123,061 teaches a golf ball made from a polyurethane prepolymer of polyether and a curing agent, such as a trifunctional polyol, a tetrafunctional polyol, or a diamine. U.S. Pat. No. 5,334,673 discloses the use of two categories of polyurethane available on the market, i.e., thermoset and thermoplastic polyurethanes, for forming golf ball covers and, in particular, thermoset polyurethane covered golf balls made from a composition of polyurethane prepolymer and a slow-reacting amine curing agent, and/or a difunctional glycol. The first commercially successful polyurethane covered golf ball was the Titleist® Professional® ball, first released in 1993.

Unlike SURLYN® or other ionomer-covered golf balls, polyurethane golf ball covers can be formulated to possess the softer "feel" of balata covered golf balls. Conventional golf ball covers made from polyurethane, however, have not fully matched SURLYN®-covered golf balls with respect to resilience or the rebound that is in part a function of the initial velocity of a golf ball after impact with a golf club.

U.S. Pat. No. 3,989,568 discloses a three-component system employing either one or two polyurethane prepolymers and one or two polyols or fast-reacting diamine curing agents. The reactants chosen for the system must have different rates of reactions within two or more competing reactions.

U.S. Pat. No. 4,123,061 discloses a golf ball made from a polyurethane prepolymer of polyether and a curing agent, such as a trifunctional polyol, a tetrafunctional polyol, or a fast-reacting diamine curing agent.

U.S. Pat. No. 5,334,673 discloses a golf ball cover made from a composition of a polyurethane prepolymer and a slow-reacting polyamine curing agent and/or a difunctional glycol. Resultant golf balls are found to have improved shear resistance and cut resistance compared to covers made from balata or SURLYN®.

U.S. Pat. No. 5,692,974 discloses methods of using cationic ionomers in golf ball cover compositions. Additionally, the patent relates to golf balls having covers and cores incorporating urethane ionomers. Improved resiliency and initial velocity are achieved by the addition of an alkylating agent such as t-butyl-chloride which induces ionic interactions in the polyurethane to produce cationic type ionomers.

International Patent Application WO 98/37929 discloses a composition for golf ball covers that comprises a blend of a diisocyanate/polyol prepolymer and a curing agent comprising a blend of a slow-reacting diamine and a fast-reacting diamine. Improved "feel", playability, and durability characteristics are exhibited.

It is thus desired to prepare wound golf balls having lower compression, i.e., a softer ball, while having the same or higher resilience than conventional wound balls. It is alternatively desired to obtain the same or lower compression while achieving greater resilience.

SUMMARY OF THE INVENTION

The present invention is directed to a wound golf ball with high resilience, such as for low swing speed players, to provide greater distance off the tee while conforming to the USGA golf rules. Methods for measuring the resiliency of golf balls are well known by those of ordinary skill in the art. One method of measuring the resiliency of a ball at impact is to utilize an air cannon or other means of propelling a ball at velocities equivalent to those of a golf club head. The balls are fired at a massive rigid block, with the inbound and outbound velocities being measured. The velocity may be measured by the use of light screens, which measure the time required for the ball to travel a fixed distance. The fixed distance divided by the transit time is equivalent to the average velocity of the ball over the fixed distance. The ratio of the outbound velocity to the inbound velocity is commonly referred to as the coefficient of restitution ("COR"). The COR is a direct measure of the resilience of a golf ball at a particular inbound velocity. Since golf balls behave in a linear-viscoelastic fashion, inbound ball velocity is functionally equivalent to club swing speed. In one embodiment, the present invention seeks to maximize the COR for low swing speed players. These players swing the club at the ball with low swing speeds, and thus tend to obtain lower ball velocity after impact and less distance off the tee.

The golf ball according to the present invention includes a center of one or more layers including a material formed from a polybutadiene material, or a reaction product thereof, having a molecular weight of greater than about 200,000 and a resilience index of at least about 40, a cover layer including a polyurethane composition, or reaction product thereof, formed from a prepolymer having no greater than 7.5 percent by weight unreacted isocyanate groups, and a wound layer including at least one thread material disposed between the center and the cover, each thread having at least one strand.

The invention further relates to a center, a wound layer surrounding the center, an inner cover layer surrounding the wound layer and having a first hardness, and an outer cover layer surrounding the inner cover layer and having a second hardness less than the first hardness and having a thickness of less than about 0.05 inches.

In one embodiment, the cover material has at least one of a dimple coverage of greater than about 60 percent, a hardness of the cover material from about 10 to 80 Shore D, or a flexural modulus of greater than about 500 psi, and wherein the golf ball has a compression from about 30 to 120. In one embodiment, the cover material hardness is from about 35 to 70 Shore D. In another embodiment, the resilience index is greater than about 50. Flexural modulus is measured by ASTM method D-6272-98. In yet another embodiment, the compression of the golf ball is from about 50 to 110.

In one embodiment, the cover includes an inner cover layer and an outer cover layer, the inner cover layer being disposed between the wound layer and the outer cover layer. In one embodiment, the inner cover layer is harder than the outer cover layer. In yet another embodiment, the inner cover layer includes at least one thermoplastic material.

In one embodiment, the polyurethane composition includes at least one isocyanate and at least one curing agent.

In yet another embodiment, the polyurethane composition includes at least one isocyanate, at least one polyol, and at least one curing agent. In a preferred embodiment, the isocyanate includes 4,4'-diphenylmethane diisocyanate, polymeric 4,4'-diphenylmethane diisocyanate, carbodiimide-modified liquid 4,4'-diphenylmethane diisocyanate, 4,4'-dicyclohexylmethane diisocyanate, p-phenylene diisocyanate, toluene diisocyanate, isophoronediisocyanate, p-methylxylene diisocyanate, m-methylxylene diisocyanate, o-methylxylene diisocyanate, or a mixture thereof. In another preferred embodiment, the at least one polyol includes a polyether polyol, hydroxy-terminated polybutadiene, polyester polyol, polycaprolactone polyol, polycarbonate polyol, or mixtures thereof. In yet another preferred embodiment the curing agent includes a polyamine curing agent, a polyol curing agent, or a mixture thereof. In a more preferred embodiment, the curing agent includes a polyamine curing agent. In a most preferred embodiment, the polyamine curing agent includes 3,5-dimethylthio-2,4-toluenediamine, or an isomer thereof; 3,5-diethyltoluene-2,4-diamine, or an isomer thereof; 4,4'-bis-(sec-butylamino)-diphenylmethane; 1,4-bis-(sec-butylamino)-benzene, 4,4'-methylene-bis-(2-chloroaniline); 4,4'-methylene-bis-(3-chloro-2,6-diethylaniline); trimethylene glycol-di-p-aminobenzoate; polytetramethyleneoxide-di-p-aminobenzoate; N,N'-dialkyldiamino diphenyl methane; p,p'-methylene dianiline; phenylenediamine; 4,4'-methylene-bis-(2-chloroaniline); 4,4'-methylene-bis-(2,6-diethylaniline); 4,4'-diamino-3,3'-diethyl-5,5'-dimethyl diphenylmethane; 2,2',3,3'-tetrachloro diamino diphenyl-methane; 4,4'-methylene-bis-(3-chloro-2,6-diethylaniline); or mixtures thereof.

In a different preferred embodiment, the curing agent includes a polyol curing agent. In a more preferred embodiment, the polyol curing agent includes ethylene glycol; diethylene glycol; polyethylene glycol; propylene glycol; polypropylene glycol; lower molecular weight polytetramethylene ether glycol; 1,3-bis(2-hydroxyethoxy) benzene; 1,3-bis-[2-(2-hydroxyethoxy)ethoxy]benzene; 1,3-bis-{2-[2-(2-hydroxyethoxy)ethoxy]ethoxy}benzene; 1,4-butanediol; 1,5-pentanediol; 1,6-hexanediol; resorcinol-di-(β-hydroxyethyl)ether; hydroquinone-di-(β-hydroxyethyl) ether; trimethylol propane, or mixtures thereof.

In one embodiment, the prepolymer has from about 2.5 percent up to 7.5 percent by weight unreacted isocyanate groups. In another embodiment, the cover layer has a thickness of less than about 0.05 inches. In yet another embodiment, the center has a Mooney viscosity from about 40 to about 80. In a preferred embodiment, the Mooney viscosity is from about 45 to about 60.

In another embodiment, the polybutadiene material has a vinyl-isomer content of less than about 2 percent by weight. In another embodiment, and possibly in addition to the previous embodiment, the polybutadiene has a cis-isomer content of at least about 95 percent by weight.

In one embodiment, the center has an outer diameter of at least about 1.3 inches, preferably from about 1.3 inches to 1.55 inches. In one preferred embodiment, the center has an outer diameter of about 1.34 to 1.4 inches. In another embodiment, the center includes a material formed from a conversion reaction of polybutadiene having a first amount of trans-isomer, a free radical source, and at least one cis-to-trans catalyst. In a preferred embodiment, the reaction occurs at a temperature and for a time sufficient to form a polybutadiene reaction product having a second amount of trans-isomer greater than the first amount of trans-isomer. In one embodiment, the cis-to-trans catalyst includes at least one of an organosulfur compound, an inorganic sulfur compound, an aromatic organometallic compound, a metal-organosulfur compound, tellurium, selenium, elemental sulfur, a polymeric sulfur, or an aromatic organic compound. Preferably, the catalyst includes an organosulfur component, and in one preferred embodiment the catalyst includes at least one of 4,4'-diphenyl disulfide, 4,4'-ditolyl disulfide, or 2,2'-benzamido diphenyl disulfide, or a combination thereof. The cis-to-trans catalyst is typically present in an amount from about 0.1 to 10 parts per hundred of polybutadiene.

In one embodiment, which further includes an additional intermediate layer between the center and the cover layer, the intermediate layer includes a material formed from a conversion reaction of polybutadiene having a first amount of trans-polybutadiene, a free radical source, and a cis-to-trans catalyst includes at least one organosulfur component, wherein the intermediate layer has an outer diameter of at least about 1.58 inches, and wherein the center has an outer diameter of less than about 1.55 inches.

In another embodiment, the cover includes an inner cover layer and an outer cover layer, the inner cover layer being disposed between the wound layer and the outer cover layer. In a preferred embodiment, at least one of the inner and outer cover layer has a thickness of less than about 0.05 inches. In another preferred embodiment, the inner cover layer includes an ionomer resin, a polyurethane, a polyetherester, a polyetheramide, a polyester, a dynamically vulcanized elastomer, a polyurea, a functionalized styrenebutadiene elastomer, a metallocene polymer, nylon, acrylonitrile butadiene-styrene copolymer, or a blend thereof.

In one embodiment, the inner cover has an outer diameter of at least about 1.55 inches. In another embodiment, the inner cover has an outer diameter of about 1.58 to about 1.64 inches. In one embodiment, the polyurethane used in forming one or both cover layers is thermoplastic or thermoset.

In one embodiment for low swing speed players, the coefficient of restitution of the golf ball at a club head speed of 160 ft/s is at least about 0.76 and the magnitude of the gradient of the coefficient of restitution to an inbound velocity is at least about 0.001 s/ft.

The invention also relates to a golf ball having at least a center including a polybutadiene having a molecular weight of greater than about 300,000 and a resilience index of at least about 40, a wound layer surrounding the center, having an outer diameter of at least about 1.51 inches, and including at least one thread material disposed between the center and the cover, each thread having at least one strand, an inner cover layer surrounding the outer core layer, and an outer cover layer disposed around the inner cover layer, the outer cover layer including a polyurethane composition formed from a prepolymer having less than 7.5 percent by weight unreacted isocyanate groups.

The invention also relates to a center including a polybutadiene having a molecular weight of greater than about 300,000 and a resilience index of at least about 40; a hoop stress layer surrounding the center, having an outer diameter of at least about 1.51 inches, and disposed between the center and the cover, wherein the hoop stress layer includes a glass, polyamide, aromatic polyamide, carbon, or metal fiber having a tensile strength of at least about 250 kpsi and a modulus of at least about 10,000 kpsi; and a cover having at least one layer disposed around the wound hoop stress layer, the cover including a polyurethane composition formed from a prepolymer having less than 7.5 percent by weight unreacted isocyanate groups.

BRIEF DESCRIPTION OF THE DRAWINGS

Further features and advantages of the invention can be ascertained from the following detailed description that is provided in connection with the drawing(s) described below.

DEFINITIONS

Figure 1:
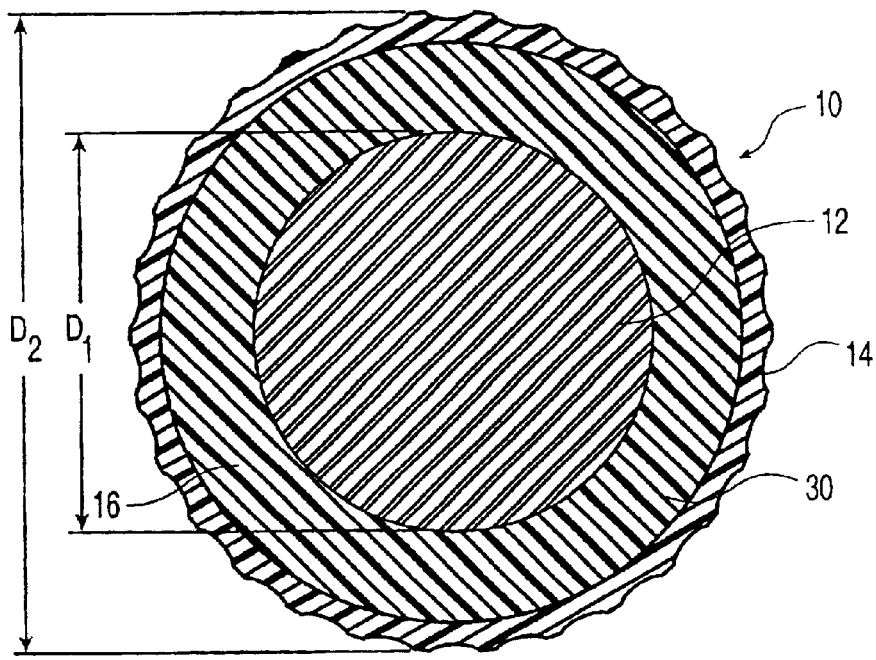
FIG. 1 is cross-sectional view of a first embodiment of a golf ball according to the present invention.

The term "about," as used herein in connection with one or more numbers or numerical ranges, should be understood to refer to all such numbers, including all numbers in a range.

As used herein, substituted and unsubstituted "aryl" groups means a hydrocarbon ring bearing a system of conjugated double bonds, typically comprising $4n+2\pi$ ring electrons, where n is an integer. Examples of aryl groups include, but are not limited to phenyl, naphthyl, anisyl, tolyl, xylenyl and the like. According to the present invention, aryl also includes heteroaryl groups, e.g., pyrimidine or thiophene. These aryl groups may also be substituted with any number of a variety of functional groups. In addition to the functional groups described herein in connection with carbocyclic groups, functional groups on the aryl groups can include hydroxy and metal salts thereof; mercapto and metal salts thereof; halogen; amino, nitro, cyano, and amido; carboxyl including esters, acids, and metal salts thereof; silyl; acrylates and metal salts thereof; sulfonyl or sulfonamide; and phosphates and phosphites; and a combination thereof.

As used herein, the term "Atti compression" is defined as the deflection of an object or material relative to the deflection of a calibrated spring, as measured with an Atti Compression Gauge, that is commercially available from Atti Engineering Corp. of Union City, N.J. Atti compression is typically used to measure the compression of a golf ball. When the Atti Gauge is used to measure cores having a diameter of less than 1.680 inches, it should be understood that a metallic or other suitable shim is used to make the measured object 1.680 inches in diameter. When referring to the compression of a core, however, it is preferred to use a compressive load measurement. The term "compressive load" is defined as the normalized load in pounds for a 10.8-percent diametrical deflection for a spherical object having a diameter of 1.68 inches.

As used herein, substituted and unsubstituted "carbocyclic" means cyclic carbon-containing compounds, including, but not limited to cyclopentyl, cyclohexyl, cycloheptyl, adamantyl, and the like. Such cyclic groups may also contain various substituents in which one or more hydrogen atoms has been replaced by a functional group. Such functional groups include those described above, and lower alkyl groups having from 1–28 carbon atoms. The cyclic groups of the invention may further comprise a heteroatom.

As used herein, "cis-to-trans catalyst" means any component or a combination thereof that will convert at least a portion of cis-polybutadiene isomer to trans-polybutadiene isomer at a given temperature. It should be understood that the combination of the cis-isomer, the trans-isomer, and any vinyl-isomer, measured at any given time, comprises 100 percent of the polybutadiene.

As used herein, the term "coefficient of restitution" ("COR") for golf balls is defined as the ratio of the rebound velocity to the inbound velocity when balls are fired into a rigid plate. The inbound velocity is understood to be 125 ft/s.

As used herein, the term "dynamic stiffness" is defined as load divided by the deflection for a 1.4-mm spherical radius penetration probe oscillating at 1 Hz with an amplitude of 100 $\mu$m. The probe dynamically penetrates the surface of a sample material. Material samples of spherical cores were prepared by sectioning out a 6-mm-thick layer along the equator of core to produce a disk 6 mm thick with one surface containing the geometric center of the core. By positioning the probe at any selected radial position on the disk, a dynamic stiffness measurement may be obtained. Accurate dynamic measurements may be made by keeping the material sample at a substantially uniform temperature. The dynamic stiffness was acquired using a Dynamic Mechanical Analyzer, Model DMA 2980 available from TA Instruments Corporation of New Castle, Del. The instrument setting for the DMA 2980 were 1-Hz frequency, 100-$\mu$m amplitude, 0.3-N static load, and auto strain of 105 percent. The 1.4-mm spherical radius probe is available from TA Instruments as a penetration kit accessory to the DMA 2980. The DMA 2980 is equipped with a temperature-controlled chamber that enables testing at a wide variety of ambient temperatures.

The method and instrument utilized for measuring "dynamic stiffness" may also be used to measure loss tangent. Loss tangent is the ratio of loss modulus to storage modulus. Loss modulus is the portion of modulus which is out of phase with displacement and storage modulus is the portion of modulus which is in phase with displacement. The DMA 2980 automatically calculates and reports loss tangent.

As used herein, the term "fluid" includes a liquid, a paste, a gel, a gas, or any combination thereof.

As used herein, the terms "Group VIA component" or "Group VIA element" mean a component that includes a sulfur component, a selenium component, or a tellurium component, or a combination thereof.

As used herein, the term "sulfur component" means a component that is elemental sulfur, polymeric sulfur, or a combination thereof. It should be further understood that "elemental sulfur" refers to the ring structure of $S_8$ and that "polymeric sulfur" is a structure including at least one additional sulfur relative to the elemental sulfur.

As used herein, the term "molecular weight" is defined as the absolute weight average molecular weight. The molecular weight is determined by the following method: approximately 20 mg of polymer is dissolved in 10 mL of tetrahydrofuran ("THF"), which may take a few days at room temperature depending on the polymer's molecular weight and distribution. One liter of THF is filtered and degassed before being placed in a high-performance liquid chromatography ("HPLC") reservoir. The flow rate of the HPLC is set to 1 mL/min through a Viscogel column. This nonshedding, mixed bed, column model $GMH_{HR}$-H, which has an ID of 7.8 mm and 300 mm long is available from Viscotek Corp. of Houston, Tex. The THF flow rate is set to 1 mL/min for at least one hour before sample analysis is begun or until stable detector baselines are achieved. During this purging of the column and detector, the internal temperature of the Viscotek TDA Model 300 triple detector should be set to 40° C. This detector is also available from Viscotek Corp. The three detectors (i.e., Refractive Index, Differential Pressure, and Light Scattering) and the column should be brought to thermal equilibrium, and the detectors should be purged and zeroed, to prepare the system for calibration according to the instructions provided with this equipment. A 100-$\mu$L aliquot of sample solution can then be injected into the equipment and the molecular weight of each sample can be calculated with the Viscotek's triple detector software. When the molecular weight of the polybutadiene material is measured, a dn/dc of 0.130 should always be used. It should be understood that this equipment and these methods provide the molecular weight numbers described and claimed herein, and that other equipment or methods will not necessarily provide equivalent values as used herein.

As used herein, the term "multilayer" means at least two layers and includes fluid or liquid center balls, wound balls, hollow-center balls, and balls with at least two intermediate layers and/or cover layers.

As used herein, the term "parts per hundred," also known as "phr," is defined as the number of parts by weight of a particular component present in a mixture, relative to 100 parts by weight of the total polymer component. Mathematically, this can be expressed as the weight of an ingredient divided by the total weight of the polymer, multiplied by a factor of 100.

As used herein the term "resilience index" is defined as the difference in loss tangent (tan $\delta$) measured at 10 cpm and 1000 cpm divided by 990 (the frequency span) multiplied by 100,000 (for normalization and unit convenience). The loss tangent is measured using an RPA 2000 manufactured by Alpha Technologies of Akron, Ohio. The RPA 2000 is set to sweep from 2.5 to 1000 cpm at a temperature of 100° C. using an arc of 0.5 degrees. An average of six loss tangent measurements were acquired at each frequency and the average is used in calculation of the resilience index. The computation of resilience index is as follows:

Resilience Index=100,000·[(loss tangent @ 10 cpm)−(loss tangent @ 1000 cpm)]/990

As used herein, the term "substantially free" means less than about 5 weight percent, preferably less than about 3 weight percent, more preferably less than about 1 weight percent, and most preferably less than about 0.01 weight percent.

DETAILED DESCRIPTION OF THE PREFERRED EMBODIMENTS

It has now been discovered that the use of a polyurethane composition, according to the present invention, in forming golf ball cores, intermediate and mantle layers, and/or covers, can raise the velocity of a golf ball prepared with the composition: (1) closer to the velocities observed with SURLYN®-covered golf balls; and (2) higher than the velocities exhibited using alternative urethane compositions. Additionally, it is desired to combine polyurethane cover compositions with polybutadiene core materials, especially those having resilience indices greater than about 40, and with at least one wound layer between the core and the cover. Cores formed of polybutadiene materials such as these have been found to provide exceptional resiliency characteristics without a loss in performance characteristics.

Thus, improved golf balls can be prepared according to the invention by: (a) including a polybutadiene reaction product in the center, such that the polybutadiene reaction product has a molecular weight of greater than about 200,000 and a resilience index of at least about 40; (b) disposing a wound layer of tensioned material about the center, optionally with one or more layers disposed therebetween; and (c) disposing a cover including at least one layer that includes a polyurethane material.

Figure 2:
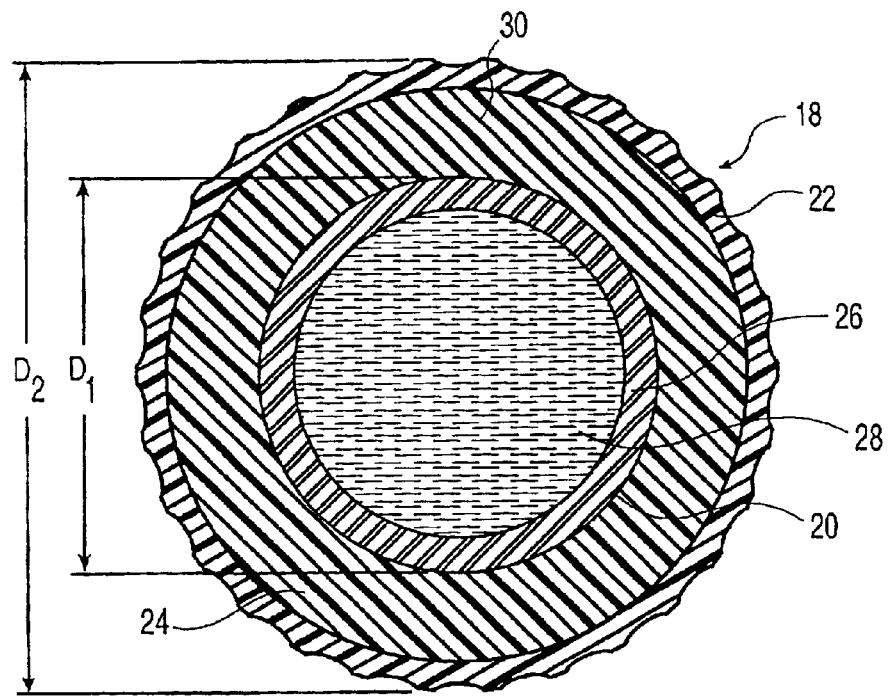
FIG. 2 is a cross-sectional view of a second embodiment of a golf ball according to the present invention.

Referring to FIGS. 1 and 2, golf balls 10 and 18 according to the present invention are shown. The golf balls are wound golf balls with high resilience, which can help low swing speed players by providing them with a ball capable of traveling a greater distance off the tee. These players usually swing the club at the ball at low swing speeds, and thus tend to obtain lower initial ball velocity after impact and less distance off the tee.

Referring to FIG. 1, a golf ball 10 according to the present invention is shown. The golf ball includes a center 12, a cover 14 and a layer of windings 16 disposed between the center and cover. As shown in FIG. 1, the center of the golf ball is solid. The center could include a thermoset solid rubber sphere, a thermoplastic solid sphere, wood, cork, metal, or any suitable material available or known to one of ordinary skill in the art. The center is covered with the wound layer and the cover according to the present invention.

Depending on the desired properties, balls prepared according to the invention can exhibit substantially the same or higher resilience, or coefficient of restitution ("COR"), with a decrease in compression or modulus, compared to balls of conventional construction. Additionally, balls prepared according to the invention can also exhibit substantially higher resilience, or COR, without an increase in compression, compared to balls of conventional construction. Another measure of this resilience is the "loss tangent," or tan $\delta$, which is obtained when measuring the dynamic stiffness of an object. Loss tangent and terminology relating to such dynamic properties is typically described according to ASTM D4092-90. Thus, a lower loss tangent indicates a higher resiliency, thereby indicating a higher rebound capacity. Low loss tangent indicates that most of the energy imparted to a golf ball from the club is converted to dynamic energy, i.e, launch velocity and resulting longer distance. The rigidity or compressive stiffness of a golf ball may be measured, for example, by the dynamic stiffness. A higher dynamic stiffness indicates a higher compressive stiffness. To produce golf balls having a desirable compressive stiffness, the dynamic stiffness of the crosslinked polybutadiene reaction product should be less than about 50,000 N/m at −50° C. Preferably, the dynamic stiffness should be from about 10,000 to 40,000 N/m at −50° C., more preferably, the dynamic stiffness should be from about 20,000 to 30,000 N/m at −50° C.

The dynamic stiffness is similar in some ways to dynamic modulus. Dynamic stiffness is dependent on probe geometry as described herein, whereas dynamic modulus is a unique material property, independent of geometry. The dynamic stiffness measurement has the unique attribute of enabling quantitative measurement of dynamic modulus and exact measurement of loss tangent at discrete points within a sample article. In the case of this invention, the article is at least a portion of a golf ball core. The polybutadiene reaction product preferably has a loss tangent below about 0.1 at −50° C., and more preferably below about 0.07 at −50° C.

The center composition preferably includes at least one rubber material having a resilience index of at least about 40. Preferably, the resilience index is at least about 50. A comparison of a number of polybutadiene polymers are listed in Table 1 below. Polymers that produce resilient golf balls and, therefore, are suitable for use in the center or other portions of a golf ball according to the present invention include, but are not limited to, CB23, CB22, BR60, and 1207G. To clarify the method of computation for resilience index, the resilience index is measured at 100° C. CB23 is commercially available from Bayer Corporation of Akron, Ohio. For CB23, for example, the resilience index is computed as follows:

Resilience Index for CB23=100,000·[(0.954)−(0.407)]/990

Resilience Index for CB23=55

TABLE 1

Resilience Index of example polybutadiene polymers

| Rubber | Tan δ at | | Resilience Index at 100° C. |
| --- | --- | --- | --- |
|  | 10 cpm | 1000 cpm |  |
| CB23 | 0.954 | 0.407 | 55 |
| CB22 | 0.895 | 0.358 | 54 |
| BR-60 | 0.749 | 0.350 | 40 |
| BR-40 | 0.841 | 0.446 | 40 |
| Taktene 8855 | 0.720 | 0.414 | 31 |
| CARIFLEX BR1220 | 0.487 | 0.439 | 5 |
| BUDENE 1207G | 0.825 | 0.388 | 44 |

The molding process and composition of golf ball portions typically results in a gradient of material properties. Methods employed in the prior art generally exploit hardness to quantify these gradients. Hardness is a qualitative measure of static modulus and does not represent the modulus of the material at the deformation rates associated with golf ball use, i.e., impact by a club. As is well known to those of ordinary skill in the art of polymer science, the time-temperature superposition principle may be used to emulate alternative deformation rates. For golf ball portions including polybutadiene, a 1-Hz oscillation at temperatures between 0° C. and −50° C. are believed to be qualitatively equivalent to golf ball impact rates. Therefore, measurement of loss tangent and dynamic stiffness at 0° C. to −50° C. may be used to accurately anticipate golf ball performance, preferably at temperatures from about −20° C. to −50° C.

The golf ball polybutadiene material typically has a hardness of at least about 15 Shore A, preferably from about 30 Shore A to 80 Shore D, more preferably from about 50 Shore A to 60 Shore D. In one preferred embodiment, the center has a hardness of about 20 to 85 Shore C, preferably from about 40 to 80 Shore C, and more preferably from about 60 to 70 Shore C at the geometric center of the golf ball center. The surface of the golf ball center is typically harder than at the geometric center of the golf ball center. For example, a golf ball center, i.e., a sphere, having a hardness of 65 Shore C at its center might have a hardness of about 80 to 85 Shore C at its surface. The specific gravity is typically greater than about 0.7, preferably greater than about 1, for the golf ball polybutadiene material.

Additionally, the unvulcanized rubber, such as polybutadiene, in golf balls prepared according to the invention typically has a Mooney viscosity of about 40 to about 80, preferably from about 45 to about 60, and more preferably from about 45 to about 55. Mooney viscosity is typically measured according to ASTM D-1646-99.

At least one of the center or optional intermediate layer includes a reaction product that includes a cis-to-trans catalyst, a resilient polymer component having polybutadiene, a free radical source, and optionally, a crosslinking agent, a filler, or both. Preferably, the polybutadiene reaction product is used to form at least a portion of the center of the golf ball, and further discussion below relates to this embodiment for preparing the center. Preferably, the reaction product has a first dynamic stiffness measured at −50° C. that is less than about 130 percent of a second dynamic stiffness measured at 0° C. More preferably, the first dynamic stiffness is less than about 125 percent of the second dynamic stiffness. Most preferably, the first dynamic stiffness is less than about 110 percent of the second dynamic stiffness.

Thus, the invention also includes a method to convert the cis-isomer of the polybutadiene resilient polymer component to the trans-isomer during a molding cycle and to form a golf ball. Various combinations of polymers, cis-to-trans catalysts, fillers, crosslinkers, and a source of free radicals, may be used. To obtain a higher resilience and lower compression center or intermediate layer, a high-molecular weight polybutadiene with a cis-isomer content preferably greater than about 90 percent is converted to increase the percentage of trans-isomer content at any point in the golf ball or portion thereof, preferably to increase the percentage throughout substantially all of the golf ball or portion thereof, during the molding cycle. More preferably, the cis-polybutadiene isomer is present in an amount of greater than about 95 percent of the total polybutadiene content. Without wishing to be bound by any particular theory, it is believed that a low amount of 1,2-polybutadiene isomer ("vinyl-polybutadiene") is desired in both the initial polybutadiene and the reaction product. Typically, the vinyl polybutadiene isomer content is less than about 7 percent. Preferably, the vinyl polybutadiene isomer content is less than about 4 percent. More preferably, the vinyl polybutadiene isomer content is less than about 2 percent. Without wishing to be bound by any particular theory, it is also believed that the resulting mobility of the combined cis- and trans-polybutadiene backbone is responsible for the lower modulus and higher resilience of the reaction product and golf balls including the same.

To produce a polymer reaction product that exhibits the higher resilience and lower modulus (low compression) properties that are desirable and beneficial to golf ball playing characteristics, high-molecular-weight cis-1,4-polybutadiene, preferably may be converted to the trans-isomer during the molding cycle. "High-molecular weight" typically means that the polybutadiene material has a molecular weight average of greater than about 200,000 Preferably, the polybutadiene molecular weight is greater than about 250,000, more preferably from about 300,000 to 500,000. Without wishing to be bound by any particular theory, it is believed that the cis-to-trans catalyst component, in conjunction with the free radical source, acts to convert a percentage of the polybutadiene polymer component from the cis- to the trans-conformation. The cis-to-trans conversion requires the presence of a cis-to-trans catalyst, such as an organosulfur or metal-containing organosulfur compound, a substituted or unsubstituted aromatic organic compound that does not contain sulfur or metal, an inorganic sulfide compound, an aromatic organometallic compound, or mixtures thereof. The cis-to-trans catalyst component may include one or more of the cis-to-trans catalysts described herein. For example, the cis-to-trans catalyst may be a blend of an organosulfur component and an inorganic sulfide component.

In one embodiment, the at least one organosulfur component is substantially free of metal, which typically means less than about 10 weight percent metal, preferably less than about 3 weight percent metal, more preferably less than about 1 weight percent metal, and most preferably only trace amounts of metal, such as less than about 0.01 weight percent. In another embodiment, the organosulfur component is completely free of metal.

As used herein when referring to the invention, the term "organosulfur compound(s)" or "organosulfur component(s)," means at least one of 4,4'-diphenyl disulfide; 4,4'-ditolyl disulfide; 2,2'-benzamido diphenyl disulfide; bis(2-aminophenyl)disulfide; bis(4-aminophenyl)disulfide; bis(3-aminophenyl)disulfide; 2,2'-bis(4-aminonaphthyl)disulfide; 2,2'-bis(3-aminonaphthyl)disulfide; 2,2'-bis(4-aminonaphthyl)disulfide; 2,2'-bis(5-aminonaphthyl)disulfide; 2,2'-bis(6-aminonaphthyl)disulfide; 2,2'-bis(7-aminonaphthyl)disulfide; 2,2'-bis(8-aminonaphthyl)disulfide; 1,1'-bis(2-aminonaphthyl)disulfide; 1,1'-bis(3-aminonaphthyl)disulfide; 1,1'-bis(3-aminonaphthyl)disulfide; 1,1'-bis(4-aminonaphthyl)disulfide; 1,1'-bis(5-aminonaphthyl)disulfide; 1,1'-bis(6-aminonaphthyl)disulfide; 1,1'-bis(7-aminonaphthyl)disulfide; 1,1'-bis(8-aminonaphthyl)disulfide; 1,2'-diamino-1,2'-dithiodinaphthalene; 2,3'-diamino-1,2'-dithiodinaphthalene; bis(4-chlorophenyl)disulfide; bis(2-chlorophenyl)disulfide; bis(3-chlorophenyl)disulfide; bis(4-bromophenyl)disulfide; bis(2-bromophenyl)disulfide; bis(3-bromophenyl)disulfide; bis(4-fluorophenyl)disulfide; bis(4-iodophenyl)disulfide; bis(2,5-dichlorophenyl)disulfide; bis(3,5-dichlorophenyl)disulfide; bis(2,4-dichlorophenyl)disulfide; bis(2,6-dichlorophenyl)disulfide; bis(2,5-dibromophenyl)disulfide; bis(3,5-dibromophenyl)disulfide; bis(2-chloro-5-bromophenyl)disulfide; bis(2,4,6-trichlorophenyl)disulfide; bis(2,3,4,5,6-pentachlorophenyl)disulfide; bis(4-cyanophenyl)disulfide; bis(2-cyanophenyl)disulfide; bis(4-nitrophenyl)disulfide; bis(2-nitrophenyl)disulfide; 2,2'-dithiobenzoic acid ethylester; 2,2'-dithiobenzoic acid methylester; 2,2'-dithiobenzoic acid; 4,4'-dithiobenzoic acid ethylester; bis(4-acetylphenyl)disulfide; bis(2-acetylphenyl)disulfide; bis(4-formylphenyl)disulfide; bis(4-carbamoylphenyl)disulfide; 1,1'-dinaphthyl disulfide; 2,2'-dinaphthyl disulfide; 1,2'-dinaphthyl disulfide; 2,2'-bis(1-chlorodinaphthyl)disulfide; 2,2'-bis(1-bromonaphthyl)disulfide; 1,1'-bis(2-chloronaphthyl)disulfide; 2,2'-bis(1-cyanonaphthyl)disulfide; 2,2'-bis(1-acetylnaphthyl)disulfide; and the like; or a mixture thereof. Preferred organosulfur components include 4,4'-diphenyl disulfide, 4,4'-ditolyl disulfide, or 2,2'-benzamido diphenyl disulfide, or a mixture thereof. A more preferred organosulfur component includes 4,4'-ditolyl disulfide. The organosulfur cis-to-trans catalyst, when present, is preferably present in an amount sufficient to produce the reaction product so as to contain at least about 12 percent trans-polybutadiene isomer, but typically is greater than about 32 percent trans-polybutadiene isomer based on the total resilient polymer component. In another embodiment, metal-containing organosulfur components can be used according to the invention. Suitable metal-containing organosulfur components include, but are not limited to, cadmium, copper, lead, and tellurium analogs of diethyldithiocarbamate, diamyldithiocarbamate, and dimethyldithiocarbamate, or mixtures thereof.

Suitable substituted or unsubstituted aromatic organic components that do not include sulfur or a metal include, but are not limited to, 4,4'-diphenyl acetylene, azobenzene or a mixture thereof. The aromatic organic group preferably ranges in size from $C_6$ to $C_{20}$, and more preferably from $C_6$ to $C_{10}$. Suitable inorganic sulfide components include, but are not limited to titanium sulfide, manganese sulfide, and sulfide analogs of iron, calcium, cobalt, molybdenum, tungsten, copper, selenium, yttrium, zinc, tin, and bismuth.

A substituted or unsubstituted aromatic organic compound may also be included in the cis-to-trans catalyst. Suitable substituted or unsubstituted aromatic organic components include, but are not limited to, components having the formula $(R_1)_x—R_3—M—R_4—(R_2)_y$, wherein $R_1$ and $R_2$ are each hydrogen or a substituted or unsubstituted $C_{1-20}$ linear, branched, or cyclic alkyl, alkoxy, or alkylthio group, or a single, multiple, or fused ring $C_5$ to $C_{24}$ aromatic group; x and y are each an integer from 0 to 5; $R_3$ and $R_4$ are each selected from a single, multiple, or fused ring $C_6$ to $C_{24}$ aromatic group; and M includes an azo group or a metal component. $R_3$ and $R_4$ are each preferably selected from a $C_6$ to $C_{10}$ aromatic group, more preferably selected from phenyl, benzyl, naphthyl, benzamido, and benzothiazyl. $R_1$ and $R_2$ are each preferably selected from a substituted or unsubstituted $C_{1-10}$ linear, branched, or cyclic alkyl, alkoxy, or alkylthio group or a $C_6$ to $C_{10}$ aromatic group. When $R_1$, $R_2$, $R_3$, or $R_4$, are substituted, the substitution may include one or more of the following substituent groups: hydroxy and metal salts thereof; mercapto and metal salts thereof; halogen; amino, nitro, cyano, and amido; carboxyl including esters, acids, and metal salts thereof; silyl; acrylates and metal salts thereof; sulfonyl or sulfonamide; and phosphates and phosphites. When M is a metal component, it may be any suitable elemental metal available to those of ordinary skill in the art. Typically, the metal will be a transition metal, although preferably it is tellurium or selenium. In one embodiment, the aromatic organic compound is substantially free of metal, while in another embodiment the aromatic organic compound is completely free of metal.

The cis-to-trans catalyst can also include a Group VIA component. Elemental sulfur and polymeric sulfur are commercially available from, e.g., Elastochem, Inc. of Chardon, Ohio. Exemplary sulfur catalyst compounds include PB(RM-S)-80 elemental sulfur and PB(CRST)-65 polymeric sulfur, each of which is available from Elastochem, Inc. An exemplary tellurium catalyst under the tradename TELLOY and an exemplary selenium catalyst under the tradename VANDEX are each commercially available from RT Vanderbilt.

The cis-to-trans catalyst is typically present in an amount from about 0.1 to 10 parts per hundred of the total resilient polymer component. Preferably, the cis-to-trans catalyst is present in an amount from about 0.1 to 8 parts per hundred of the total resilient polymer component. More preferably, the cis-to-trans catalyst is present in an amount from about 0 1 to 5 parts per hundred of the total resilient polymer component. The cis-to-trans catalyst is typically present in an amount sufficient to produce the reaction product so as to increase the trans-polybutadiene isomer content to contain from about 5 percent to 70 percent trans-polybutadiene based on the total resilient polymer component.

The measurement of trans-isomer content of polybutadiene referred to herein was and can be accomplished as follows. Calibration standards are prepared using at least two polybutadiene rubber samples of known trans-content, e.g., high and low percent trans-polybutadiene). These samples are used alone and blended together in such a way as to create a ladder of trans-polybutadiene content of at least about 1.5% to 50% or to bracket the unknown amount, such that the resulting calibration curve contains at least about 13 equally spaced points.

Using a commercially available Fourier Transform Infrared ("FTIR") spectrometer equipped with a Photoacoustic ("PAS") cell, a PAS spectrum of each standard was obtained using the following instrument parameters: scan at speed of 2.5 KHz (0.16 cm/s optical velocity), use a 1.2 KHz electronic filter, set an undersampling ratio of 2 (number of laser signal zero crossings before collecting a sample), co-add a minimum of 128 scans at a resolution of 4 $cm^{-1}$ over a range of 375 to 4000 $cm^{-1}$ with a sensitivity setting of 1.

The cis-, trans-, and vinyl-polybutadiene peaks are typically found between 600 and 1100 $cm^{-1}$ in the PAS spectrum. The area under each of the trans-polybutadiene peaks can be integrated. Determining the fraction of each peak area relative to the total area of the three isomer peaks allow construction of a calibration curve of the trans-polybutadiene area fraction versus the actual trans-polybutadiene content. The correlation coefficient ($R^2$) of the resulting calibration curve must be a minimum of 0.95.

A PAS spectrum is obtained, using the parameters described above, for the unknown core material at the point of interest (e.g., the surface or center of the core) by filling the PAS cell with a sample containing a freshly cut, uncontaminated surface free of foreign matters, such as mold release and the like. The trans-polybutadiene area fraction of the unknown is analyzed to determine the actual trans-isomer content from the calibration curve.

In one known circumstance when barium sulfate is included, the above method for testing trans-content may be less accurate. Thus, an additional or alternative test of the trans-content of polybutadiene is as follows. Calibration standards are prepared using at least two polybutadienes of known trans-content (e.g., high and low percent trans-polybutadiene). These samples are used alone and blended together in such a way as to create a ladder of trans-polybutadiene content of at least about 1.5% to 50% or to bracket the unknown amount, such that the resulting calibration curve contains at least about 13 equally spaced points.

Using a Fourier Transform Raman ("FT-Raman") spectrometer equipped with a near-infrared laser, a Stokes Raman spectrum should be obtained from each standard using the following instrument parameters: sufficient laser power to obtain a good signal-to-noise ratio ("S/N") without causing excessive heating or fluorescence (typically about 400 to 800 mW is suitable); a resolution of 2 $cm^{-1}$; over a Raman shift spectral range of about 400 to 4000 $cm^{-1}$; and co-adding at least 300 scans.

A calibration curve may be constructed from the data generated above, using a chemometrics approach and software such as PLSplus/IQ from Galactic Industries Corp. of Salem, N.H. An acceptable calibration was obtained with this software using a PLS-1 curve generated using an SNV (detrend) pathlength correction, a mean center data preparation, and a 5-point SG second derivative over the spectral range from about 1600 to 1700 $cm^{-1}$. The correlation coefficient ($R^2$) of the resulting calibration curve must be a minimum of 0.95.

A Raman spectrum of the core material is obtained using this instrument at the point of interest in the sample (e.g., surface or center of the golf ball core). The sample must be free of foreign matter, such as mold release, etc. Analyze the spectrum of the sample using the PLS calibration curve to determine trans-polybutadiene isomer content of the sample.

A free-radical source, often alternatively referred to as a free-radical initiator, is required in the composition and method. The free-radical source is typically a peroxide, and preferably an organic peroxide. Suitable free-radical sources include di-t-amyl peroxide, di(2-t-butyl-peroxyisopropyl) benzene peroxide, 3,3,5-trimethyl cyclohexane, a-a bis(t-butylperoxy)diisopropylbenzene, 1,1-bis(t-butylperoxy)-3, 3,5-trimethylcyclohexane, dicumyl peroxide, di-t-butyl peroxide, 2,5-di-(t-butylperoxy)-2,5-dimethyl hexane, n-butyl-4,4-bis(t-butylperoxy)valerate, lauryl peroxide, benzoyl peroxide, t-butyl hydroperoxide, and the like, and any mixture thereof. The peroxide is typically present in an amount greater than about 0.1 parts per hundred of the total resilient polymer component, preferably about 0.1 to 15 parts per hundred of the resilient polymer component, and more preferably about 0.2 to 5 parts per hundred of the total resilient polymer component. It should be understood by those of ordinary skill in the art that the presence of certain cis-to-trans catalysts according to the invention may require a larger amount of free-radical source, such as the amounts described herein, compared to conventional cross-linking reactions. The initiator(s) at 100% activity are preferably added in an amount ranging from about 0.05 phr to 5 phr based upon 100 parts of polybutadiene. More preferably, the amount of initiator added ranges from about 0.15 phr to 4 phr, and most preferably from about 0.25 phr to 3 phr. The free radical source may alternatively or additionally be one or more of an electron beam, UV or gamma radiation, x-rays, or any other high energy radiation source capable of generating free radicals. It should be further understood that heat often facilitates initiation of the generation of free radicals.

A crosslinking agent is included to increase the hardness of the reaction product. Suitable crosslinking agents include one or more metallic salts of unsaturated fatty acids or monocarboxylic acids, such as zinc, aluminum, sodium, lithium, nickel, calcium, or magnesium acrylate salts, and the like, and mixtures thereof. Preferred acrylates include zinc acrylate, zinc diacrylate, zinc methacrylate, and zinc dimethacrylate, and mixtures thereof. The crosslinking agent must be present in an amount sufficient to crosslink a portion of the chains of polymers in the resilient polymer component. For example, the desired compression may be obtained by adjusting the amount of crosslinking. This may be achieved, for example, by altering the type and amount of crosslinking agent, a method well-known to those of ordinary skill in the art. The crosslinking agent is typically present in an amount greater than about 0.1 percent of the resilient polymer component, preferably from about 10 to 40 percent of the resilient polymer component, more preferably from about 10 to 30 percent of the resilient polymer component. When an organosulfur is selected as the cis-to-trans catalyst, zinc diacrylate may be selected as the crosslinking agent and is preferably present in an amount of less than about 25 phr. Suitable, commercially available, zinc diacrylates include those from the Sartomer Corporation.

The compositions of the present invention may also include fillers, added to the polybutadiene material to adjust the density and/or specific gravity of the core or to the cover. As used herein, the term "fillers" includes any compound or composition that can be used to adjust the density and/or other properties of the subject golf ball core. Fillers useful in the golf ball core according to the present invention include, for example, zinc oxide, barium sulfate, flakes, fibers, and regrind, which is ground, recycled core material (for example, ground to about 30 mesh particle size). The amount and type of filler utilized is governed by the amount and weight of other ingredients in the composition, since a maximum golf ball weight of 45.93 g (1.62 ounces) has been established by the United States Golf Association (USGA). Appropriate fillers generally used have a specific gravity from about 2 to 20. In one preferred embodiment, the specific gravity can be about 2 to 6. In one embodiment, the center material can have a specific gravity of about 1 to 5, preferably about 1.1 to 2.

Fillers are typically polymeric or mineral particles. Exemplary fillers include precipitated hydrated silica; clay; talc; asbestos; glass fibers; aramid fibers; mica; calcium metasilicate; barium sulfate; zinc sulfide; lithopone; silicates; silicon carbide; diatomaceous earth; polyvinyl chloride; carbonates such as calcium carbonate and magnesium carbonate; metals such as titanium, tungsten, aluminum, bismuth, nickel, molybdenum, iron, lead, copper, boron, cobalt, beryllium, zinc, and tin; metal alloys such as steel, brass, bronze, boron carbide whiskers, and tungsten carbide whiskers; metal oxides such as zinc oxide, iron oxide, aluminum oxide, titanium oxide, magnesium oxide, and zirconium oxide; particulate carbonaceous materials such as graphite, carbon black, cotton flock, natural bitumen, cellulose flock, and leather fiber; micro balloons such as glass and ceramic; fly ash; and combinations thereof.

Antioxidants may also optionally be included in the polybutadiene material in the centers produced according to the present invention. Antioxidants are compounds that can inhibit or prevent the oxidative degradation of the polybutadiene. Antioxidants useful in the present invention include, but are not limited to, dihydroquinoline antioxidants, amine type antioxidants, and phenolic type antioxidants.

Other optional ingredients, such as accelerators, e.g. tetramethylthiuram, peptizers, processing aids, processing oils, plasticizers, dyes and pigments, as well as other additives well known to those of ordinary skill in the art may also be used in the present invention in amounts sufficient to achieve the purpose for which they are typically used.

The polymers, free-radical initiator, filler(s), and any other materials used in forming either the golf ball center or any portion of the core, in accordance with invention, may be combined to form a mixture by any type of mixing known to one of ordinary skill in the art. Suitable types of mixing include single pass and multi-pass mixing, and the like. The crosslinking agent, and any other optional additives used to modify the characteristics of the golf ball center or additional layer(s), may similarly be combined by any type of mixing. A single-pass mixing process where ingredients are added sequentially is preferred, as this type of mixing tends to increase efficiency and reduce costs for the process. The preferred mixing cycle is single step wherein the polymer, cis-trans catalyst, filler, zinc diacrylate, and peroxide are added sequentially. Suitable mixing equipment is well known to those of ordinary skill in the art, and such equipment may include a Banbury mixer, a two-roll mill, or a twin screw extruder. Conventional mixing speeds for combining polymers are typically used, although the speed must be high enough to impart substantially uniform dispersion of the constituents. On the other hand, the speed should not be too high, as high mixing speeds tend to break down the polymers being mixed and particularly may undesirably decrease the molecular weight of the resilient polymer component. The speed should thus be low enough to avoid high shear, which may result in loss of desirably high molecular weight portions of the polymer component. Also, too high a mixing speed may undesirably result in creation of enough heat to initiate the crosslinking before the preforms are shaped and assembled around a core. The mixing temperature depends upon the type of polymer components, and more importantly, on the type of free-radical initiator. For example, when using di(2-t-butyl-peroxyisopropyl) benzene as the free-radical initiator, a mixing temperature of about 80° C. to 125° C., preferably about 88° C. to 110° C., and more preferably about 90° C. to 100° C., is suitable to safely mix the ingredients. Additionally, it is important to maintain a mixing temperature below the peroxide decomposition temperature. For example, if dicumyl peroxide is selected as the peroxide, the temperature should not exceed 200° F. Suitable mixing speeds and temperatures are well-known to those of ordinary skill in the art, or may be readily determined without undue experimentation.

The mixture can be subjected to, e.g., a compression or injection molding process, to obtain solid spheres for the center or hemispherical shells for forming an intermediate layer. The polymer mixture is subjected to a molding cycle in which heat and pressure are applied while the mixture is confined within a mold. The cavity shape depends on the portion of the golf ball being formed. The compression and heat liberates free radicals by decomposing one or more peroxides, which may initiate the cis-to-trans conversion and crosslinking simultaneously. The temperature and duration of the molding cycle can be readily selected based upon the type of peroxide and cis-trans catalyst selected. The molding cycle may have a single step of molding the mixture at a single temperature for a fixed time duration. An example of a single step molding cycle, for a mixture that contains dicumyl peroxide, would hold the polymer mixture at 335° F. for a duration of 11 minutes at about 2,500 psi. The molding cycle may also include a two-step process, in which the polymer mixture is held in the mold at an initial temperature for an initial duration of time, followed by holding at a second, typically higher temperature for a second duration of time. An example of a two-step molding cycle would be holding the mold at 290° F. for 40 minutes, then ramping the mold to 340° F. where it is held for a duration of 20 minutes. In a preferred embodiment of the current invention, a single-step cure cycle is employed. Single-step processes are effective and efficient, reducing the time and cost of a two-step process. The resilient polymer component, polybutadiene, cis-to-trans conversion catalyst, additional polymers, free-radical initiator, filler, and any other materials used in forming either the golf ball center or any portion of the core, in accordance with the invention, may be combined to form a golf ball by an injection molding process, which is also well-known to one of ordinary skill in the art. Although the curing time depends on the various materials selected, a particularly suitable curing time is about 5 to 18 minutes, preferably from about 8 to 15 minutes, and more preferably from about 10 to 12 minutes. Those of ordinary skill in the art will be readily able to adjust the curing time upward or downward based on the particular materials used and the discussion herein.

The cured resilient polymer component, which contains a greater amount of trans-polybutadiene than the uncured resilient polymer component, is formed into an article having a first hardness at a point in the interior and a surface having a second hardness such that the second hardness differs from the first hardness by greater than 10 percent of the first hardness. Preferably, the article is a sphere and the point is the midpoint of the article. In another embodiment, the second hardness differs from the first by greater than 20 percent of the first hardness. The cured article also has a first amount of trans-polybutadiene at an interior location and a second amount of trans-polybutadiene at a surface location, wherein the first amount is at least about 6 percent less than the second amount, preferably at least about 10 percent less than the second amount, and more preferably at least about 20 percent less than the second amount. The interior location is preferably a midpoint and the article is preferably a sphere. The compression of the center, or portion of the center, of golf balls prepared according to the invention is typically from about 15 to 100. In one embodiment, the compression is below about 50, more preferably below about 25. In a preferred embodiment, the compression is from about 60 to 90, more preferably from about 70 to 85. Various equivalent methods of measuring compression exist. For example, a 70 Atti compression (also previously referred to as the "PGA Compression") is equivalent to a center hardness of 3.2 mm deflection under a 100 kg load and a "spring constant" of 36 Kgf/mm. In one embodiment, the golf ball center has a deflection of about 3.3 mm to 7 mm under a 130 kg–10 kg test. In one preferred embodiment, the core has an intrinsic frequency of about 1,500 to 3,500 Hz.

Referring now to FIG. 2, a golf ball 18 is shown having a center 20, a cover 22 and a layer of windings 24 disposed between the center and cover. The center in, FIG. 2 is a fluid-filled sphere or shell 26, such as a rubber sack, a thermoplastic, or metallic shell design. In this embodiment, the polybutadiene reaction product of the invention can be disposed in the shell, but is preferably in a layer disposed around the shell (not shown) or used in forming the tensioned thread in the wound layer 24. It should be understood from the above discussion that a solid center may be formed of the polybutadiene reaction product in accordance with the invention. The fluid 28 employed in the embodiment shown in FIG. 2 could be of any suitable composition or viscosity. It is also feasible to construct such a center with a void (hollow) or "gas" center. The center is covered with an optional intermediate layer (not shown), the wound layer, and the cover according to the present invention. In one embodiment, the cover includes at least two layers wherein at least one of the two cover layers includes the polyurethane cover material of the invention.

The envelope or shell 26 can be filled with a wide variety of materials for fluid including air, gas, water solutions, gels, foams, hot-melts, other fluid materials and combinations thereof, such as those set forth in U.S. Pat. No. 5,683,312, which is incorporated herein by reference. The fluid or liquid in the center can be varied to modify the performance parameters of the ball, such as the moment of inertia, weight, initial spin, and spin decay.

Suitable gases included in the fluid-filled center include air, nitrogen and argon. Preferably, the gas is inert. Examples of suitable liquids include either solutions such as salt in water, corn syrup, salt in water and corn syrup, glycol and water or oils. The liquid can further include water soluble or dispersable organic compounds, pastes, colloidal suspensions, such as clay, barytes, carbon black in water or other liquid, or salt in water/glycol mixtures. Examples of suitable gels include water gelatin gels, hydrogels, water/methyl cellulose gels and gels comprised of copolymer rubber based materials such a styrene-butadiene-styrene rubber and paraffinic and/or naphthionic oil. Examples of suitable melts include waxes and hot melts. Hot-melts are materials which are solid at or about normal room temperatures but become liquid at elevated temperatures become liquid.

The fluid can also be a reactive liquid system which combines to form a solid or create internal pressure within the envelope. Examples of suitable reactive liquids that form solids are silicate gels, agar gels, peroxide cured polyester resins, two part epoxy resin systems and peroxide cured liquid polybutadiene rubber compositions. Of particular interest are liquids that react to form expanding foams. It is understood by one of ordinary skill in the art that other reactive liquid systems can likewise be utilized depending on the physical properties of the envelope and the physical properties desired in the resulting finished golf balls.

Preferably, the center 12 and 18 of FIGS. 1 and 2 has an outer diameter $D_1$ of at least about 1 inches, more preferably about 1.3 to 1.55 inches. In one embodiment, the outer diameter of the center is about 1.34 inches to 1.4 inches. Preferably, the wound layer, 16 and 24, respectively, has an outer diameter $D_2$ of about 1.5 to 1.62 inches, more preferably about 1.54 to 1.6 inches. The layer of windings of the golf balls is formed by at least one thread 30. Thus, the amount of thread used tends to be small in comparison with the size of the core. The wound layer lowers compression and results in a ball having a softer feel. In one embodiment, the thickness of the wound layer is less than about 0.3 inches. In one preferred embodiment, the thickness of the wound layer is less than about 0.1 inches. In this preferred embodiment, it is preferred that the thread material include polyether urea or a very hard, high-tensile-modulus thread. "Hard, high-tensile-modulus" should be understood herein to mean a tensile modulus of at least about 10,000 ksi.

Thread materials including polyisoprene, polyether urea, polyester, polyethylene, polypropylene, or combinations thereof may be used with the present invention. Relatively high and low modulus threads may be wound simultaneously around a center. Moreover, in another embodiment, a thread that "softens" during the compression and/or injection molding cycles, creating a "mantle" layer or a fused cover, such as polyether urea could be used. Also, a thread that does not exhibit softening during molding, such as polyisoprene, may be used with the present invention. In one embodiment, it is preferred to use thread including polyether urea in the wound layer.

Threads used in the present invention may be formed using a variety of processes including conventional calendering and slitting. Furthermore, processes such as melt spinning, wet spinning, dry spinning or polymerization spinning may also be used to provide threads. Melt spinning is a highly economic process. Polymers are extruded through spinnerets by a heated spin pump. The resulting fibers are drawn off at rates up to 1200 m/min. The fibers are drawn and allowed to solidify and cool in the air. Because of the high temperatures required, only melting and thermally stable polymers can be melt spun. These polymers include poly(olefins), aliphatic polyamides, and aromatic polyesters, all of which are suitable thread materials.

For polymers that decompose on melting, the wet spinning method is used. Solutions of about 5 to 20% are passed through the spinnerets by a spin pump. A precipitation bath is used to coagulate the filaments and a drawing or stretching bath is used to draw the filaments. Filament production rates under this method are lower than melt spinning, typically about 50 to 100 m/min. Because of solvent recovery costs, this method is less economical.

In dry spinning, air is the coagulating bath. The method is usable for polymers that decompose on melting, however only when readily volatile solvents are known for the polymers. Solutions of about 20 to 55% are used. After leaving spinneret orifices, resulting filaments enter a chamber having a length of about 5 to 8 m. In the chamber, jets of warn air are directed toward the filaments. This causes the solvent to evaporate and the filaments to solidify. The process has higher rates of spinning than the wet spinning process. Typically, filament production rates are about 300 to 500 m/min. The initial capital investment of equipment is higher, but the operation costs are lower than in wet spinning. Further, this process is only usable for spinning polymers for which readily volatile solvents are known.

In another method of spinning, polymerization spinning, a monomer is polymerized together with initiators, fillers, pigments, and flame retardants, or other selected additives. The polymerizate is directly spun at rates of about 400 m/min. The polymerizate is not isolated. Only rapidly polymerizing monomers are suitable for this method. For example, LYCRA® is produced by polymerization spinning.

Figure 3:
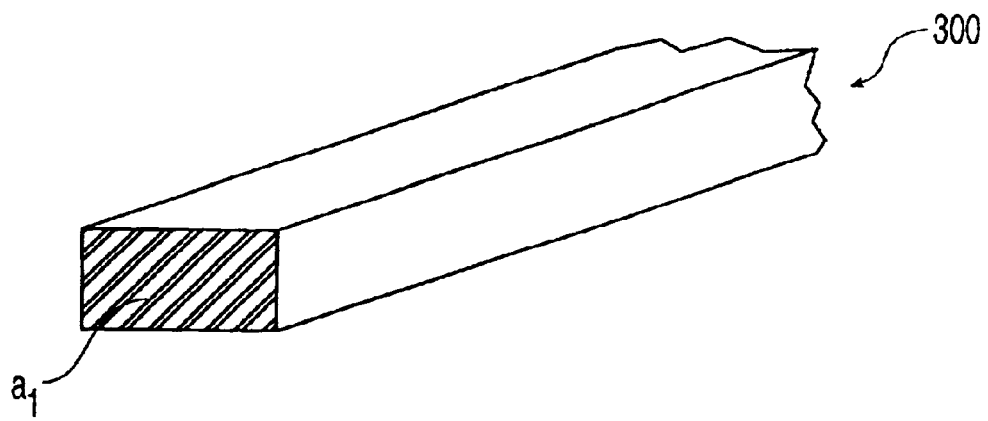
FIG. 3 is an enlarged, partial perspective view of a conventional single-ply thread for use in a golf ball of the present invention.

Many different kinds of threads are usable with the present invention. For example, referring to FIG. 3, a conventional single-ply golf ball thread 300 is shown. In general, the single-ply golf ball thread 300 is formed by mixing synthetic cis-polyisoprene rubber, natural rubber and a curing system together, calendering this mixture into a sheet, curing the sheet, and slitting the sheet into threads. The thread is generally rectangular and its dimensions are preferably 0.0625×0.02 inches. The typical area of the thread 300 is $a_1$, which is generally about 0.0013 in$^2$. This material can be applied in a very thin layer over the center.

Figure 4:
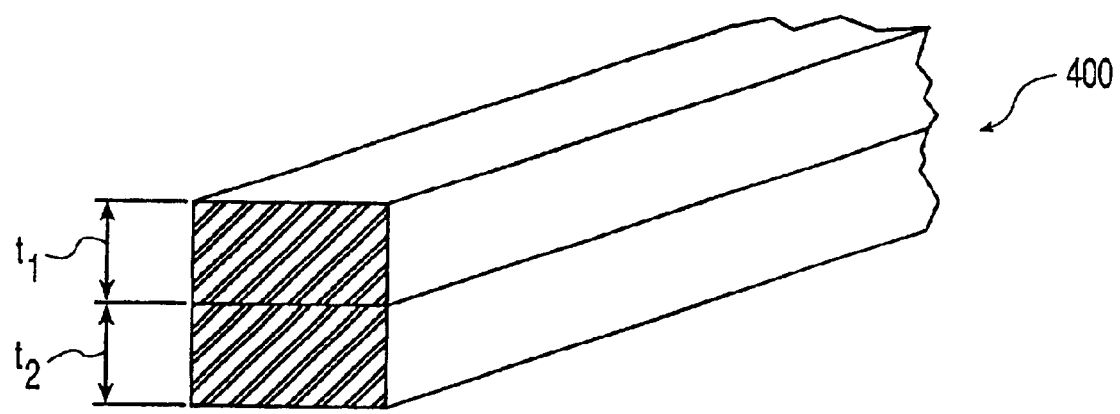
FIG. 4 is an enlarged, partial perspective view of a conventional two-ply thread for use in a golf ball of the present invention, but FIG. 4 is not necessarily properly scaled in comparison to the other FIGS.

Referring to FIG. 4, a conventional two-ply golf ball thread 400 is shown that is also usable with the present invention. In the case of the two-ply golf ball thread, the mixture and calendering steps are the same as on the single-ply thread. However, after the sheets are thus formed, they are calendered together, cured to bond the plies or sheets together and slit into threads. Each ply of the thread 400 has a thickness, $t_1$ and $t_2$, respectively. Generally, these thicknesses are substantially the same and each ply also has the same physical properties.

Figure 5:
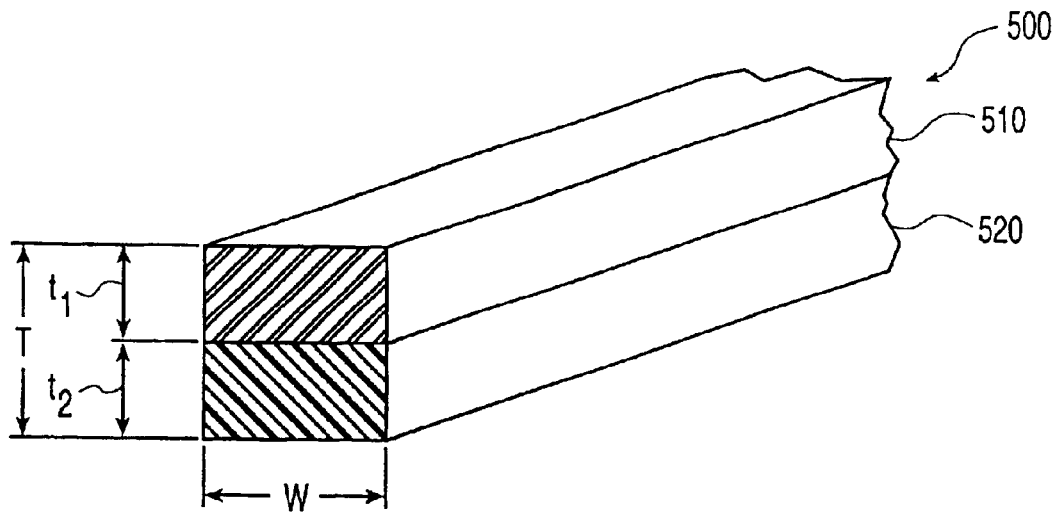
FIG. 5 is an enlarged, partial perspective view of another two-ply thread for use in the golf ball of the present invention, but FIG. 5 is not necessarily properly scaled in comparison to the other FIGS.

As shown in FIG. 5, another two-ply thread, usable with the present invention, is formed by the conventional techniques of mixing the thread materials, calendering the thread materials into sheets of the two plies, calendering the sheets or plies together, connecting the plies together, and slitting the sheets into two threads 500. The step of connecting the plies together can be by vulcanizing the material while the two plies are held together under pressure, which will bond the plies together. The vulcanization system is a sulfur bearing system that is activated by heat and known by those of ordinary skill in the art. Preferably, the first ply 510 is more resilient and the second ply 520 is more processable, as evidenced by the physical properties of each ply.

Figure 6:
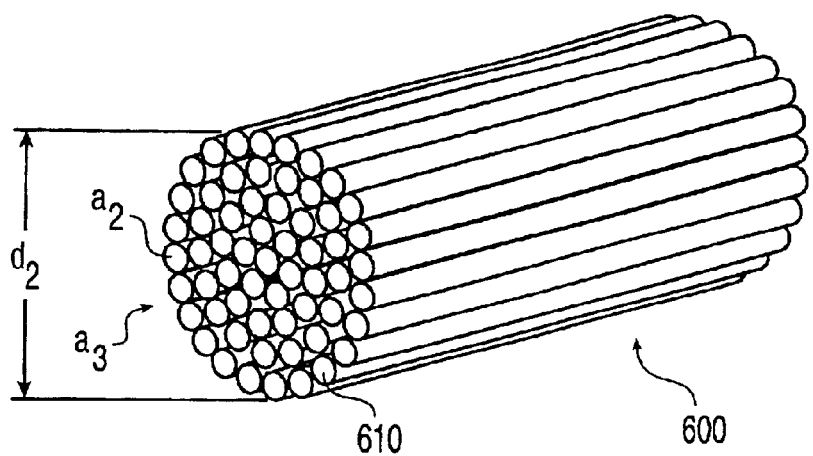
FIG. 6 is an enlarged, partial perspective view of a thread for use in the golf ball of the present invention, but FIG. 6 is not necessarily scaled properly in comparison to the other FIGS.

Another type of thread usable in the present invention is shown in FIG. 6. Thread 600 is comprised of many individual filaments or strands 610. Preferably over 10 strands 610 make up the thread 600, and more preferably over 50 strands 610 form the thread 600 Most preferably, the thread contains greater than 100 strands. The strands 610 have a small diameter, typically of a diameter of less than about 0.002 inches, and more preferably less than about 0.0001 inches. Preferably, the strands of the present invention have a cross-sectional area $a_2$ of less than about 0.0001 in$^2$ and most preferably less than about 0.00001 in$^2$. Preferably, the thread of this embodiment has a cross-sectional area $a_3$ of less than about 0.001 in$^2$ and most preferably less than about 0.0005 in$^2$. Threads formed of multiple strands can be prepared according to the invention by reference to U.S. Pat. No. 6,149,535, the disclosure of which is hereby incorporated herein by express reference thereto.

Preferably, the thread has an elongation to break of greater than about 8%. More preferably, the thread has an elongation to break of greater than about 25%. A minimum of about 8% thread elongation prior to breakage allows the golf ball to deform during impact. A golf ball where the thread deforms significantly less than about 8% during a typical driver impact will feel hard when struck and will have undesirable spin and feel characteristics. In one embodiment, the thread has an elongation to break of about 200% to 1000%. Preferably, the elastic modulus of the thread in the wound state is greater than about 10,000 psi. In one preferred embodiment, the elastic modulus is greater than about 20,000 psi. In another preferred embodiment, the elastic modulus is greater than about 25,000 psi.

The strands 610 of the thread 600 of FIG. 6 may be held together with a binder as shown or their may be spun together. Melt spinning, wet spinning, dry spinning, and polymerization spinning may be used to produce the threads. Each method has been discussed in more detail herein.

The thread 600 of FIG. 6 preferably includes a polymeric material. Suitable polymers include polyether urea, such as LYCRA®; polyester urea; polyester block copolymers, such as HYTREL®; isotactic-poly(propylene); polyethylene; polyamide; poly(oxymethylene); polyketone; poly(ethylene terephthalate), such as DACRON®; poly(p-phenylene terephthalamide), such as KEVLAR®; poly(acrylonitrile), such as ORLON®; trans,trans-diaminodicyclohexylmethane and dodecanedicarboxylic acid, such as QUINA®. LYCRA®, HYTREL®, DACRON®, KEVLAR®, ORLON®, and QUINA® are available from E.I. DuPont de Nemours & Co. of Wilmington, Del. Glass fiber and, for example, S-GLASS® from Corning Corporation can also be used. Also. D7 Globe thread by Globe Manufacturing of Fall River, Mass. can be used. Indeed, a mixture of any of the thread materials discussed herein can be included in a thread layer of the invention.

The thread 600 may also be comprised of strands 610 having different physical properties to achieve desired stretch and elongation characteristics. For example, the thread may include strands of a first elastic type of material that is weak but resilient and also strands of a second elastic type of material that is stronger but less resilient. In another example, the thread may include at least one strand of polyisoprene rubber thread having a diameter of less than about 0.02 inches. This strand may be surrounded by about 10 to 50 polyether urea strands each having a diameter of less than about 0.002 inches.

In another embodiment, the golf ball can include a wound hoop-stress layer, either alternatively or in addition to a wound layer as described above. The wound layer is formed of high tensile fiber wound about the inner core and preferably in contact with the inner core. A variety of high tensile modulus fibers may provide the requisite hoop stress in a minimally thick layer, preferably glass, Dacron, polyamide, aromatic polyamide (such as DuPont's Kevlar aramid fiber), carbon, or metal fibers. Metals, such as steel (particularly stainless steel), monel metal, or titanium are preferred. A hoop layer created from metal fiber may have an increased moment of inertia, and thus can rotate at a slower speed when struck with a golf club and can thus retain its rotational velocity longer during flight.

The strength of these high tensile elastic modulus fibers is preferably high to accommodate the extremely high stresses placed upon the golf ball windings when struck with a golf club. It can be varied, however, to provide a golf ball with a good feel and durability. A tensile strength of at least about 250 kpsi is preferred, however, a tensile strength of at least about 500 kpsi is more preferred. The tensile elastic modulus of the high tensile elastic modulus fiber along with its gauge or thickness may also be varied to provide a stiffer, a softer, or a more durable ball as desired. A modulus of at least about 10,000 kpsi is preferred. A modulus of at least about 20,000 kpsi is most preferred. The hoop layer is preferably wound to a thickness of about 0.01 to 0.10 inches. In one hoop layer embodiment, an initial strain of at least 100% is preferred on the tensioned material.

In the hoop layer embodiment, the high tensile elastic modulus fiber that is used to form the wound layer may have an initial tension applied to the fiber during the winding process, preferably of less than about 4% strain. An initial strain of less than about 10% is more preferred. An initial strain of less than about 25% is most preferred. The fiber itself is preferably continuous for ease of winding about the core.

The golf balls 10 of FIGS. 1 and 2 may be made by any conventional process employed in the golf ball art. For example, the golf ball of FIG. 1 can be manufactured by injection or compression molding the solid center 12. The thread 30 is then wound about the solid center 12 to form the wound layer 16 as previously described. The cover layer or layers 14 can then be injection or compression molded or cast about the wound layer 16 by processes which are well known in the art. Most preferably, the golf ball according to the present invention has a solid center, and is wound with a polyether urea LYCRA® thread having at least about 100 strands, the strands each having a diameter of about 0.0001 inches and wound at an elongation of about 200 to about 500%.

Turning to FIG. 2, a golf ball 18 of the present invention can be formed by initially forming the shell 26 by compression molding hemispherical cups, the cups are bonded together to form the shell to create a cavity and filling the cavity with fluid or liquid 28 to form the fluid filled center 20. It should be understood that FIG. 2, as described here, depicts one embodiment of the invention where the wound ball is fluid-filled. In an alternative embodiment, the center layer(s) are solid. The thread 30 can then be wound directly around the shell to form the wound layer as previously described if there are no additional layers desired between the center and wound layer, otherwise, the intermediate layer(s) are formed around the shell before the tensioned material is disposed about the center layers. The cover can then be disposed about the wound layer, such as by injection or compression molding or by casting according to the invention.

Figure 7:
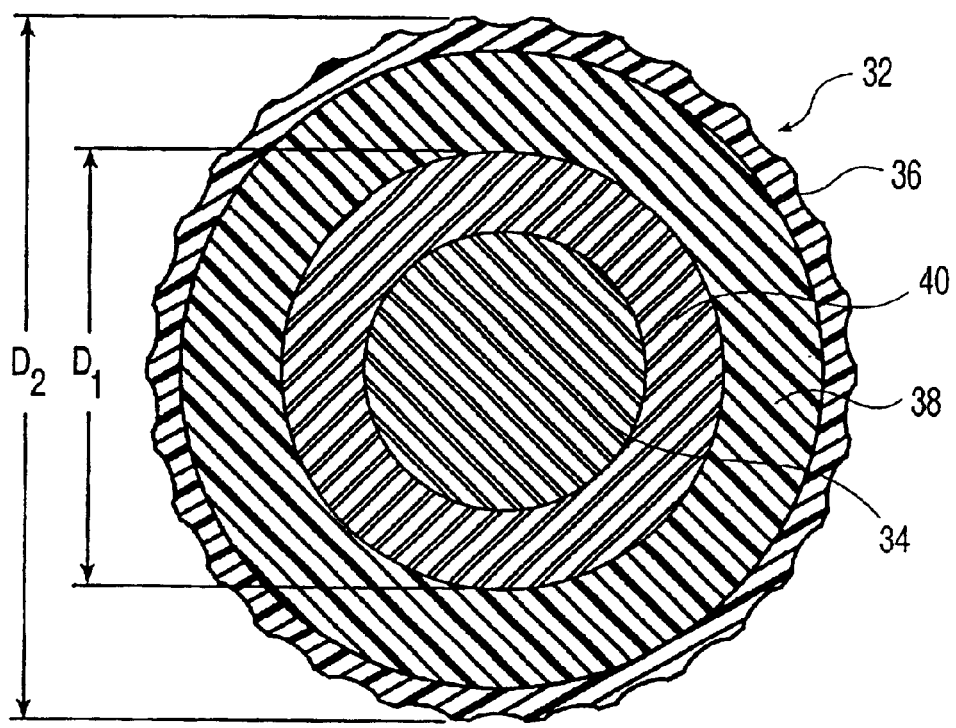
FIG. 7 is a cross-sectional view of a golf ball according to the present invention having an additional layer.

Referring to FIG. 7, a golf ball 32 is shown having a solid center 34, a cover 36 and a wound layer 38 disposed between the center and the cover. The center 34 may also be a liquid filled center formed, as described above. An additional layer or layers 40 can be formed over the center. For example, as shown in FIG. 7, a mantle layer 40 is formed over the center. A wound layer formed of at least one thread material, according to the present invention as described above, is formed over the mantle layer. A cover is formed over the wound layer. Moreover, there are many variations of FIG. 7, including forming the wound layer, according to the present invention, immediately adjacent the center, with an optional intermediate layer (or mantle) formed over the wound layer. Furthermore, it is conceivable that instead of a solid mantle layer, a second wound layer or layers could be formed either between the center and the wound layer according to the present invention, or between the wound layer according to the present invention and the cover. Numerous materials, as previously described herein, could be used to form these additional layers.

Referring to FIGS. 1, 2 and 7, the cover 14, 22 and 36 provides the interface between the ball and a club. The cover 14, 22, 34 provides the interface between the ball and a club.

Properties that are desirable for the cover are good moldability, high abrasion resistance, high tear strength, high resilience, and good mold release, among others. The cover typically has a thickness to provide sufficient strength, good performance characteristics and durability. The cover preferably has a thickness of less than about 0.1 inches, more preferably, less than about 0.05 inches, and most preferably, from about 0.02 to about 0.04 inches. The invention is particularly directed towards a multilayer golf ball that includes a core having at least one wound layer therein, an inner cover layer, and an outer cover layer. In this embodiment, preferably, at least one of the inner and outer cover layers has a thickness of less than about 0.05 inches, more preferably from about 0.02 to about 0.04 inches. Most preferably, the thickness of each cover layer is about 0.03 inches.

In the embodiment with an inner and outer cover layers, the inner cover layer can be prepared as follows. Although injection or compression molding, or casting, can be used, in one preferred embodiment the inner cover is formed over the wound center by using compression molding. A suitable speed for increasing the pressure to close the molds around the wound centers can be readily determined, bearing in mind that too rapid an increase in pressure or the molds and centers therein can cause the centers to fracture and/or break, e.g., less than 1 second. Thus, a time on the order of greater than 1 second to about 30 seconds, preferably 2 seconds to 20 seconds may be suitable depending on other process conditions and the materials involved. In one preferred embodiment, a time of 15 seconds is most suitable for closing the mold. It should be understood that this time is measured from when each half of the mold is in contact with the material therebetween and relates to the time over which the pressure on the molds and centers is increased to fully close the molds. This method advantageously helps inhibit or avoid weld lines that can occur using injection molding methods.

One suitable injection molding embodiment involves the use of a high rate injection mold using a 14 inch per second screw injection speed. Such equipment can be obtained from Krauss Maffei Machines in Munich, Germany. A cycle time of about 20 seconds to 30 seconds can be used. This rapid injection molding method is also suitable for forming the inner and outer cover layers, as it can also advantageously strengthen weld lines.

The inner cover, when optionally but preferably included in the cover layer, can be formed of the same types of materials described herein as the outer cover layer In one embodiment, the inner cover includes a thermoplastic, such as an ionomer, a polyamide, a polyetherester, polyurea, or a metallocene-catalyzed polymer, or a combination thereof. In one preferred embodiment, the inner cover layer includes a blend of 50 weight percent SURLYN 8940 (Na neutralized) and 50 weight percent SURLYN 7940 (Li neutralized). In another embodiment, the inner cover layer can include one or more polyureas, which can be prepared by reacting an organic isocyanate and an organic amine, each having taco or more functional groups. Particularly useful isocyanates include aliphatic, arylaliphatic; and aromatic isocyanates, which in one embodiment include an isocyanate content of at least about 29%. In one preferred embodiment, the isocyanate can be present in an amount of about 29 to 34 weight percent. Typical amine-curing agents for use in a polyurea include one or more organic diamines and triamines. Aromatic diamines are preferred. Particularly suitable polyurea materials include those described in U.S. Pat. No. 5,484,870, the disclosure of which is incorporated herein by express reference thereto.

The outer diameter of the inner cover layer is typically from about 1.55 inches to 1.65 inches. In one embodiment, the outer diameter is from about 1.6 inches to 1.64 inches. An exemplary inner cover layer outer diameter is 1.62 inches. The inner cover layer typically has a thickness of about 0.025 inches to 0.08 inches, preferably about 0.03 inches to 0.05 inches. In one preferred embodiment, the thickness of the inner cover layer is about 0.032 inches to 0.038 inches. In one preferred embodiment, the inner cover layer has a hardness of about 20 to 80 Shore D, preferably about 50 to 75 Shore D, and more preferably about 65 to 72 Shore D when measured on the wound center. A slab of the material will have a slightly lower hardness, such that the inner cover layer having a hardness of 68 Shore D would have a hardness of about 64 Shore D if the material is measured directly. The compression of the inner cover layer is typically from about 20 to 100, preferably from about 50 to 95. In one preferred embodiment, the inner cover layer compression is from about 75 to 90. In one embodiment, the inner cover layer has a specific gravity of about 0.8 to 1.3, preferably about 0.9 to 1.1. In one embodiment, the weight of the partly formed golf ball including inner cover layer is about 40 g to 46 g, preferably about 40 to 42 g. The loss tangent of the inner cover layer can, in one embodiment, be from about 0.03 to 0.08 from a temperature of about $-30°$ C. to $20°$ C. The elasticity and complex modulus of the inner cover layer can be from about 5,000 to 12,000 Kgf/cm$^2$ over a temperature of about $-30°$ C. to $20°$ C.

The cover layer, or inner and outer cover layers, can each include any materials known to those of ordinary skill in the art, including thermoplastic and thermosetting materials, but preferably the inner cover layer can include any suitable materials, such as ionic copolymers of ethylene and an unsaturated monocarboxylic acid which are available under the trademark SURLYN of E.I. DuPont de Nemours & Co., of Wilmington, Del., or IOTEK or ESCOR of Exxon. These are copolymers or terpolymers of ethylene and methacrylic acid or acrylic acid partially neutralized with salts of zinc, sodium, lithium, magnesium, potassium, calcium, manganese, nickel or the like, in which the salts are the reaction product of an olefin having from 2 to 8 carbon atoms and an unsaturated monocarboxylic acid having 3 to 8 carbon atoms. The carboxylic acid groups of the copolymer may be totally or partially neutralized and might include methacrylic, crotonic, maleic, fumaric or itaconic acid.

This golf ball can likewise include one or more homopolymeric or copolymeric materials, such as:

(1) Vinyl resins, such as those formed by the polymerization of vinyl chloride, or by the copolymerization of vinyl chloride with vinyl acetate, acrylic esters or vinylidene chloride;

(2) Polyolefins, such as polyethylene, polypropylene, polybutylene and copolymers such as ethylene methylacrylate, ethylene ethylacrylate, ethylene vinyl acetate, ethylene methacrylic or ethylene acrylic acid or propylene acrylic acid and copolymers and homopolymers produced using a single-site catalyst or a metallocene catalyst;

(3) Polyurethanes, such as those prepared from polyols and diisocyanates or polyisocyanates and those disclosed in U.S. Pat. No. 5,334,673;

(4) Polyureas, such as those disclosed in U.S. Pat. No. 5,484,870;

(5) Polyamides, such as poly(hexamethylene adipamide) and others prepared from diamines and dibasic acids, as well as those from amino acids such as poly (caprolactam), and blends of polyamides with SURLYN, polyethylene, ethylene copolymers, ethyl-propylene-non-conjugated diene terpolymer, and the like;

(6) Acrylic resins and blends of these resins with poly vinyl chloride, elastomers, and the like;

(7) Thermoplastics, such as urethanes; olefinic thermoplastic rubbers, such as blends of polyolefins with ethylene-propylene-non-conjugated diene terpolymer; block copolymers of styrene and butadiene, isoprene or ethylene-butylene rubber; or copoly(ether-amide), such as PEBAX, sold by Atofina of Philadelphia, Pa. (formerly Elf Atochem); (8) Polyphenylene oxide resins or blends of polyphenylene oxide with high impact polystyrene as sold under the trademark NORYL by General Electric Company of Pittsfield, Mass.;

(9) Thermoplastic polyesters, such as polyethylene terephthalate, polybutylene terephthalate, polyethylene terephthalate/glycol modified and elastomers sold under the trademarks HYTREL by E.I. DuPont de Nemours & Co. of Wilmington, Del., and LOMOD by General Electric Company of Pittsfield, Mass;

(10) Blends and alloys, including polycarbonate with acrylonitrile butadiene styrene, polybutylene terephthalate, polyethylene terephthalate, styrene maleic anhydride, polyethylene, elastomers, and the like, and polyvinyl chloride with acrylonitrile butadiene styrene or ethylene vinyl acetate or other elastomers; and

(11) Blends of thermoplastic rubbers with polyethylene, propylene, polyacetal, nylon, polyesters, cellulose esters, and the like.

In one embodiment, the cover layer(s) include one or more polymers, such as ethylene, propylene, butene-1 or hexane-1 based homopolymers or copolymers including functional monomers, such as acrylic and methacrylic acid and fully or partially neutralized ionomer resins and their blends, methyl acrylate, methyl methacrylate homopolymers and copolymers, imidized, amino group containing polymers, polycarbonate, reinforced polyamides, polyphenylene oxide, high impact polystyrene, polyether ketone, polysulfone, poly(phenylene sulfide), acrylonitrile-butadiene, acrylic-styrene-acrylonitrile, poly(ethylene terephthalate), poly(butylene terephthalate), poly(ethelyne vinyl alcohol), poly(tetrafluoroethylene) and their copolymers including functional comonomers; and blends thereof Suitable cover compositions also include a polyether or polyester thermoplastic urethane, a thermoset polyurethane, a low modulus ionomer, such as acid-containing ethylene copolymer ionomers, including E/X/Y terpolymers where E is ethylene, X is an acrylate or methacrylate-based softening comonomer present in about 0 to 50 weight percent and Y is acrylic or methacrylic acid present in about 5 to 35 weight percent. More preferably, in a low spin rate embodiment designed for maximum distance, the acrylic or methacrylic acid is present in about 15 to 35 weight percent, making the ionomer a high modulus ionomer. In a high spin embodiment, the cover includes an ionomer where an acid is present in about 10 to 15 weight percent and includes a softening comonomer. In one preferred embodiment of the invention, one or more polyurea components can be included in the inner cover layer, the outer cover layer, or both.

The cover preferably includes a polyurethane composition comprising the reaction product of at least one polyisocyanate and at least one curing agent. The curing agent can include, for example, one or more diamines, one or more polyols, or a combination thereof. The at least one polyisocyanate can be combined with one or more polyols to form a prepolymer, which is then combined with the at least one curing agent. Thus, when polyols are described herein they may be suitable for use in one or both components of the polyurethane material, i.e., as part of a prepolymer and in the curing agent. The polyurethane composition may be used in forming the inner cover, outer cover, or both. In one preferred embodiment, the outer cover includes the polyurethane composition.

Any polyisocyanate available to one of ordinary skill in the art is suitable for use according to the invention. Exemplary polyisocyanates include, but are not limited to, 4,4'-diphenylmethane diisocyanate ("MDI"), polymeric MDI, carbodiimide-modified liquid MDI, 4,4'-dicyclohexylmethane diisocyanate ("$H_{12}$MDI"), p-phenylene diisocyanate ("PPDI"), toluene diisocyanate ("TDI"), 3,3'-dimethyl-4,4'-biphenylene diisocyanate ("TODI"), isophoronediisocyanate ("IPDI"), hexamethylene diisocyanate ("HDI"), naphthalene diisocyanate ("NDI"); xylene diisocyanate ("XDI"); para-tetramethylxylene diisocyanate ("p-TMXDI"); meta-tetramethylxylene diisocyanate ("m-TMXDI"); ethylene diisocyanate; propylene-1,2-diisocyanate; tetramethylene-1,4-diisocyanate; cyclohexyl diisocyanate; 1,6hexamethylene-diisocyanate ("HDI"); dodecane-1,12-diisocyanate; cyclobutane-1,3-diisocyanate; cyclohexane-1,3-diisocyanate; cyclohexane-1,4-diisocyanate; 1-isocyanato-3,3,5-trimethyl-5-isocyanatomethylcyclohexane; methyl cyclohexylene diisocyanate; triisocyanate of HDI; triisocyanate of 2,4,4-trimethyl-1,6-hexane diisocyanate ("TMDI"), tetracene diisocyanate, naphthalene diisocyanate, anthracene diisocyanate, and mixtures thereof. Polyisocyanates are known to those of ordinary skill in the art as having more than one isocyanate group, e.g., di-, tri-, and tetra-isocyanate. Preferably, the polyisocyanate includes MDI, PPDI, TDI, or a mixture thereof, and more preferably, the polyisocyanate includes MDI. It should be understood that, as used herein, the term "MDI" includes 4,4'-diphenylmethane diisocyanate, polymeric MDI, carbodiimide-modified liquid MD], and mixtures thereof and, additionally, that the diisocyanate employed may be "low free monomer," understood by one of ordinary skill in the art to have lower levels of "free" monomer isocyanate groups than conventional diisocyanates, i.e., the compositions of the invention typically have less than about 0.1% free monomer groups. Examples of "low free monomer" diisocyanates include, but are not limited to Low Free Monomer MDI, Low Free Monomer TDI, and Low Free Monomer PPDI.

The at least one polyisocyanate should have less than about 14% unreacted NCO groups. Preferably, the at least one polyisocyanate has no greater than about 7.5% NCO, more preferably, from about 2.5% to about 7.5%, and most preferably, from about 4% to about 6.5%.

Any polyol available to one of ordinary skill in the art is suitable for use according to the invention. Exemplary polyols include, but are not limited to, polyether polyols, hydroxy-terminated polybutadiene (including partially/fully hydrogenated derivatives), polyester polyols, polycaprolactone polyols, and polycarbonate polyols. In one preferred embodiment, the polyol includes polyether polyol, more preferably those polyols that have the generic structure:

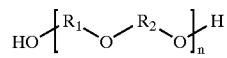

where $R_1$ and $R_2$ are straight or branched hydrocarbon chains, each containing from 1 to about 20 carbon atoms, and n is a whole integer that ranges from 1 to about 45. Examples include, but are not limited to, polytetramethylene ether glycol ("PTMEG"), polyethylene propylene glycol, polyoxypropylene glycol, and mixtures thereof. The hydrocarbon chain can have saturated or unsaturated bonds and substituted or unsubstituted aromatic and cyclic groups. Preferably, the polyol of the present invention includes PTMEG.

In another embodiment, polyester polyols are included in the polyurethane material of the invention. Preferred polyester polyols have the generic structure:

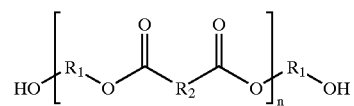

where $R_1$ and $R_2$ are straight or branched hydrocarbon chains, each containing from 1 to about 20 carbon atoms, and n is a whole integer that ranges from 1 to about 25. Suitable polyester polyols include, but are not limited to, polyethylene adipate glycol, polybutylene adipate glycol, polyethylene propylene adipate glycol, ortho-phthalate-1,6-hexanediol, and mixtures thereof. The hydrocarbon chain can have saturated or unsaturated bonds, or substituted or unsubstituted aromatic and cyclic groups.

In another embodiment, polycaprolactone polyols are included in the materials of the invention. Preferably, any polycaprolactone polyols have the generic structure:

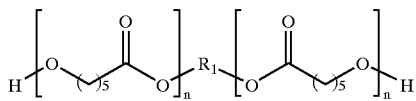

where $R_1$ is a straight chain or branched hydrocarbon chain containing from 1 to about 20 carbon atoms, and n is the chain length and is a whole integer that ranges from 1 to about 20. Suitable polycaprolactone polyols include, but are not limited to, 1,6-hexanediol-initiated polycaprolactone, diethylene glycol initiated polycaprolactone, trimethylol propane initiated polycaprolactone, neopentyl glycol initiated polycaprolactone, 1,4-butanediol-initiated polycaprolactone, and mixtures thereof. The hydrocarbon chain can have saturated or unsaturated bonds, or substituted or unsubstituted aromatic and cyclic groups.

In yet another embodiment, the polycarbonate polyols are included in the polyurethane material of the invention. Preferably, any polycarbonate polyols have the generic structure:

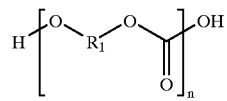

where $R_1$ is predominantly bisphenol A units -(p-$C_6H_4$)—C(CH$_3$)$_2$-(p-$C_6H_4$)—or derivatives thereof, and n is the chain length and is an integer that ranges from 1 to about 20.

Suitable polycarbonates include, but are not limited to, polyphthalate carbonate. The hydrocarbon chain can have saturated or unsaturated bonds, or substituted or unsubstituted aromatic and cyclic groups. In one embodiment, the molecular weight of the polyol is from about 200 to about 4000.

Polyamine curatives are also suitable for use in the curing agent of the polyurethane composition of the invention and have been found to improve cut, shear, and impact resistance of the resultant balls. Preferred polyamine curatives include, but are not limited to, 3,5-dimethylthio-2,4-toluenediamine and isomers thereof; 3,5-diethyltoluene-2,4-diamine and isomers thereof, such as 3,5-diethyltoluene-2,6-diamine; 4,4'-bis-(sec-butylamino)-diphenylmethane; 1,4-bis-(sec-butylamino)-benzene, 4,4'-methylene-bis-(2-chloroaniline); 4,4'-methylene-bis-(3-chloro-2,6-diethylaniline); polytetramethyleneoxide-di-p-aminobenzoate; N,N'-dialkyldiamino diphenyl methane; p,p'-methylene dianiline ("MDA"); m-phenylenediamine ("MPDA"); 4,4'-methylene-bis-(2-chloroaniline) ("MOCA"); 4,4'-methylene-bis-(2,6-diethylaniline); 4,4'-diamino-3,3'-diethyl-5,5'-dimethyl diphenylmethane; 2,2',3,3'-tetrachloro diamino diphenylmethane; 4,4'-methylene-bis-(3-chloro -2,6-diethylaniline); trimethylene glycol di-p-aminobenzoate; and mixtures thereof Preferably, the curing agent of the present invention includes 3,5-dimethylthio-2, 4-toluenediamine and isomers thereof, such as ETHACURE 300. Suitable polyamine curatives, which include both primary and secondary amines, preferably have weight average molecular weights ranging from about 64 to about 2000.

Other suitable polyamine curatives include those having the general formula:

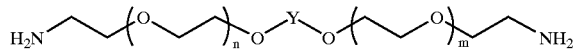

where n and m each separately have values of 0, 1, 2, or 3, and where Y is 1,2-cyclohexyl, 1,3-cyclohexyl, 1,4-cyclohexyl, ortho-phenylene, meta-phenylene, or para-phenylene, or a combination thereof. Preferably, n and m, each separately, have values of 0, 1, or 2, and preferably, 1 or 2.

At least one of a diol, triol, tetraol, or hydroxy-terminated curative may be added to the aforementioned polyurethane composition. Suitable diol, triol, and tetraol groups include ethylene glycol; diethylene glycol; polyethylene glycol: propylene glycol; polypropylene glycol; lower molecular weight polytetramethylene ether glycol; 1,3-bis-2-hydroxyethoxy)benzene; 1,3-bis-[2-(2-hydroxyethoxy) ethoxy]benzene; 1,3-bis-{2-[2-(2-hydroxyethoxy)ethoxy] ethoxy}benzene, 1,4-butanediol; 1,5-pentanediol; 1,6-hexanediol; resorcinol-di-(βhydroxyethyl)ether; hydroquinone-di-(β-hydroxyethyl)ether; and mixtures thereof. Preferred hydroxy-terminated curatives include ethylene glycol; diethylene glycol; 1,4butanediol; 1,5-pentanediol; 1,6-hexanediol, trimethylol propane, and mixtures thereof.

Preferably, the hydroxy-terminated curatives have molecular weights ranging from about 48 to 2000. It should be understood that molecular weight, as used herein, is the absolute weight average molecular weight and would be understood as such by one of ordinary skill in the art. Other suitable hydroxy-terminated curatives have the following general chemical structure:

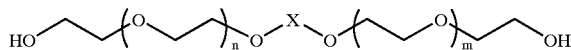

where n and m each separately have values of 0, 1, 2, or 3, and where X is ortho-phenylene, meta-phenylene,para-phenylene, 1,2-cyclohexyl, 1,3-cyclohexyl, or 1,4-cyclohexyl, or mixtures thereof. Preferably, n and m each separately have values of 0, 1, or 2, and more preferably, 1 or 2.

Both the hydroxy-terminated and amine curatives can include one or more saturated, unsaturated, aromatic, and cyclic groups. Additionally, the hydroxy-terminated and amine curatives can include one or more halogen groups. The polyurethane composition can be formed with a blend or mixture of curing agents. If desired, however, the polyurethane composition may be formed with a single curing agent.

Any method known to one of ordinary skill in the art may be used to combine the polyisocyanate, polyol, and curing agent of the present invention. One commonly employed method, known in the art as a one-shot method, involves concurrent mixing of the polyisocyanate, polyol, and curing agent. This method results in a mixture that is inhomogenous (more random) and affords the manufacturer less control over the molecular structure of the resultant composition. A preferred method of mixing is known as a prepolymer method. In this method, the polyisocyanate and the polyol are mixed separately prior to addition of the curing agent. This method affords a more homogeneous mixture resulting in a more consistent polymer composition.

An optional filler component may be chosen to impart additional density to blends of the previously described components. The selection of the filler component is dependent upon the characteristics of the golf ball desired. Examples of fillers for use in the filler component of the polyurethane include those described herein for the polybutadiene reaction component. Similar or identical additives, such as nanoparticles, fibers, glass spheres, and/or various metals, such as titanium and tungsten, can be added to the polyurethane compositions of the present invention, as well, in amounts as needed to modify one or more golf ball properties. Additional components that can be added to the polyurethane composition include UV stabilizers and other dyes, as well as optical brighteners and fluorescent pigments and dyes. Such additional ingredients may be added in any amounts that will achieve their desired purpose.

Due to the very thin nature, it has been found by the present invention that the use of a castable, reactive material, which is applied in a fluid form, makes it possible to obtain very thin outer cover layers on golfballs. Specifically, it has been found that castable, reactive liquids, which react to form a urethane elastomer material, provide desirable very thin outer cover layers.

The castable, reactive liquid employed to form the urethane elastomer material can be applied over the inner core using a variety of application techniques such as spraying, dipping, spin coating, or flow coating methods which are well known in the art. An example of a suitable coating technique is that which is disclosed in U.S. Pat. No. 5,733, 428, filed May 2, 1995 entitled "Method And Apparatus For Forming Polyurethane Cover On A Golf Ball," the disclosure of which is hereby incorporated herein in its entirety by express reference thereto.

The cover, or the outer cover if both inner and outer cover layers are present, is preferably formed around the core by mixing and introducing the material in the mold halves. It is important that the viscosity be measured over time, so that the subsequent steps of filling each mold half, introducing the core into one half and closing the mold can be properly timed for accomplishing centering of the core cover halves fusion and achieving overall uniformity. A suitable viscosity range of the curing urethane mix for introducing cores into the mold halves is determined to be approximately from about 2,000 cP to about 30,000 cP, with the preferred range of about 8,000 cP to about 15,000 cP.

To start the cover formation, mixing of the prepolymer and curative can be accomplished in motorized mixer including mixing head by feeding through lines metered amounts of curative and prepolymer. Top preheated mold halves are filled and placed in fixture units using pins moving into holes in each mold. After the reacting materials have resided in top mold halves for about 50 to about 80 seconds, a core is lowered at a controlled speed into the gelling reacting mixture. At a later time, a bottom mold half or a series of bottom mold halves have similar mixture amounts introduced into the cavity.

A ball cup can hold the ball core through reduced pressure (or partial vacuum) in hose. Upon location of the coated core in the halves of the mold after gelling for about 50 to about 80 seconds, the vacuum is released allowing core to be released. The mold halves, with core and solidified cover half thereon, are removed from the centering fixture unit, inverted and mated with other mold halves which, at an appropriate time earlier, have had a selected quantity of reacting polyurethane prepolymer and curing agent introduced therein to commence gelling.

Similarly, U.S. Pat. No. 5,006,297 to Brown et al. and U.S. Pat. No. 5,334,673 to Wu both also disclose suitable molding techniques which may be utilized to apply the castable reactive liquids employed in the present invention. The disclosures of each patent is hereby expressly incorporated herein by express reference thereto. The method of the invention, however, is not limited to the use of these techniques.

In one embodiment, the cover typically has a loss tangent of 0.16 to 0.075 from −30° C. to 20° C. In one embodiment, the complex modulus of the cover layer on the ball is from about 1000 to 2800 Kgf/cm$^2$ from −30° C. to 20° C. In one embodiment, the specific gravity of the cover material is from about 1 to 2, preferably from about 1.1 to 1.4. In one preferred embodiment, the cover material has a specific gravity of about 1.15 to 1.25.

When golf balls are prepared according to the invention, they typically will have dimple coverage greater than about 60 percent, preferably greater than about 65 percent, and more preferably greater than about 75 percent. The flexural modulus of the cover on the golf balls is typically greater than about 500 psi, and is preferably from about 500 psi to 150,000 psi. As discussed herein, the outer cover layer is preferably formed from a relatively soft polyurethane material. In particular, the material of the outer cover layer should have a material hardness, as measured by ASTM-2240, from about 30 to about 70 Shore D. preferably from about 45 to about 60 Shore D. In one embodiment, the hardness of the outer cover material is about 52 Shore D. When the hardness of the outer cover material is measured by measuring the hardness of the golf ball, the hardness tends to be higher than for the material. For example, a hardness of 45 Shore D for the cover material might be 55 Shore D when measured on the ball. The inner cover layer, if present, preferably has a material hardness from about 50 to about 75 Shore D, preferably from about 60 to about 65 Shore D. The material hardnesses will depend on many factors, including the thickness and hardness of any other cover layers.

The resultant golf balls typically have a coefficient of restitution of greater than about 0.7, preferably greater than about 0.75, and more preferably greater than about 0.78. The golf balls also typically have an Atti compression (which has been referred to as PGA compression in the past) of at least about 40, preferably from about 50 to 120, and more preferably from about 60 to 100. The golf ball polybutadiene material of the present invention typically has a flexural modulus of from about 500 psi to 300,000 psi, preferably from about 2000 to 200,000 psi. The golf ball polybutadiene material of the present invention typically has a flexural modulus of from about 500 psi to 300,000 psi, preferably from about 2000 to 200,000 psi.

EXAMPLES

These and other aspects of the present invention may be more fully understood with reference to the following examples, which are merely illustrative of the preferred embodiment of the present invention golf ball construction. The examples are not to be construed as limiting the invention.

A variety of cores were prepared according to the present invention, as well as some cores prepared using conventional materials. All cores in Table 2 were prepared to a diameter of 1.58 inches. The recipes for each core, and values measured for compression and COR are presented in Table 2 below:

TABLE 2

Golf Ball Core Properties from Various Rubber Formulations

| Ingredients | Mooney viscosity @ 100° C. | Ex. 1 | Ex. 2 | Ex. 3 | Ex. 4 | Ex. 5 |
|---|---|---|---|---|---|---|
| CB23 | 51 | 100 | | | | |
| CB22 | 63 | | 100 | | | |
| BR-60 | 60 | | | 100 | | |
| Taktene 8855 | 48 | | | | 100 | |
| CARIFLEX BR1220 | 43 | | | | | 100 |
| zinc diacrylate (phr) | | 28 | 28 | 28 | 28 | 28 |
| peroxide (phr) | | 0.53 | 0.53 | 0.53 | 0.53 | 0.53 |
| zinc oxide (phr) | | 4.3 | 4.3 | 4.3 | 4.3 | 4.3 |
| tungsten (phr) | | 11 | 11 | 11 | 11 | 11 |
| Core Properties | | | | | | |
| compression | | 77 | 75 | 77 | 76 | 71 |
| COR @ 125 ft/s | | 0.815 | 0.811 | 0.810 | 0.807 | 0.802 |

A variety of metal sulfide cis-to-trans catalysts that successfully converted a portion of the cis-polybutadiene isomer to the trans-isomer are presented in Table 3. CARIFLEX BR1220 polybutadiene (100 phr) was reacted with zinc oxide (5 phr), dicumyl peroxide (3 phr, the free radical initiator), and zinc diacrylate (25 phr), to form a reaction product according to the present invention.

TABLE 3

Metal Sulfide Conversion Examples

| CARIFLEX BR1220 | 100 | 100 | 100 | 100 | 100 | 100 | 100 | 100 | 100 | 100 | 100 | 100 | 100 |
|---|---|---|---|---|---|---|---|---|---|---|---|---|---|
| Zinc oxide | 5 | 5 | 5 | 5 | 5 | 5 | 5 | 5 | 5 | 5 | 5 | 5 | 5 |
| Dicumyl peroxide | 3 | 3 | 3 | 3 | 3 | 3 | 3 | 3 | 3 | 3 | 3 | 3 | 3 |
| Zinc Diacrylate | 25 | 25 | 25 | 25 | 25 | 25 | 25 | 25 | 25 | 25 | 25 | 25 | 25 |
| Cis-to-Trans "Catalyst" | | | | | | | | | | | | | |
| FeS | 2.87 | | | | | | | | | | | | |
| MnS | | 2.65 | | | | | | | | | | | |
| $TiS_2$ | | | 1.70 | | | | | | | | | | |
| CaS | | | | 2.20 | | | | | | | | | |
| CoS | | | | | 2.77 | | | | | | | | |
| $MoS_2$ | | | | | | 2.43 | | | | | | | |
| $WS_2$ | | | | | | | 3.77 | | | | | | |
| $Cu_2S$ | | | | | | | | 4.65 | | | | | |
| $SeS_2$ | | | | | | | | | 2.19 | | | | |
| $Y_2S_3$ | | | | | | | | | | 2.76 | | | |
| ZnS | | | | | | | | | | | 2.97 | | |
| $Sb_2S_3$ | | | | | | | | | | | | 3.45 | |
| $Bi_2S_3$ | | | | | | | | | | | | | 5.22 |
| % Trans BR isomer Precure | 1.5 | 1.5 | 1.5 | 1.5 | 1.5 | 1.5 | 1.5 | 1.5 | 1.5 | 1.5 | 1.5 | 1.5 | 1.5 |
| % Trans BR isomer Postcure | 10.5 | 16.1 | 17.0 | 8.3 | 10.3 | 10.1 | 9.2 | 5.8 | 5.2 | 10.2 | 10.1 | 10.7 | 10.5 |

Trans-isomer conversion percentages range from below 8 percent to above 17 percent for the various catalysts that are present in amounts ranging from below 1.7 phr to above 3.7 phr. The table clearly demonstrates the effectiveness of numerous different cis-to-trans catalysts, at varying concentrations, for increasing the trans-polybutadiene content.

Example 1

A Core Prepared From According to the Invention, Employing an Organosulfur Cis-to-Trans Catalyst A core was created according to the present invention employing an organosulfur compound as the cis-to-trans conversion catalyst. The resultant core properties clearly demonstrate the advantages of a golf ball core made according to the current invention, as compared to example cores constructed with conventional technology. The components and physical characteristics are presented in Table 4.

The compressive load of a core prepared according to the invention is approximately half of the compressive load of cores constructed in accordance with U.S. Pat. Nos. 5,697,856, 5,252,652, and 4,692,497, while at the same time having roughly the same, and in some cases higher, COR (resilience). The core made according to the current invention have a lower compressive load (soft), yet are resilient (fast). The compressive load is greater than that of a core constructed in accordance with U.S. Pat. No. 3,239,228, but has a significantly higher COR. The core of U.S. Pat. No. 3,239,228 is very soft and very slow (very low COR).

The percent change in dynamic stiffness from 0° C. to −50° C. was also measured at both the edge and center of the core. The dynamic stiffness at both the edge and the center of the core of the current invention varied only slightly, less than 20 percent, over the temperature range investigated. The core made according to U.S. Pat. No. 3,239,228 varied over 230 percent, whereas the cores made according to other conventional technology, had a dynamic stiffness that varied by greater than 130 percent, and typically by as much as 150 percent, over the same temperature range.

The percent of trans-isomer conversion was also measured at both the center and edge of the core prepared according to the current invention, and for cores prepared as disclosed in the same four patents mentioned above, allowing a trans-gradient to be calculated. The core according to the current invention had a trans-gradient of about 32 percent from edge to center. For the core prepared according to the current invention, the pre- and post-cure trans-percentages were also measured to determine the effectiveness of that process. The percentage of polybutadiene converted to the trans-isomer ranged from almost 40 percent at the center to greater than 55 percent at the edge. Two of the cores prepared according to conventional technology, U.S. Pat. Nos. 3,239,228 and 4,692,497, had a zero trans-gradient. A third core, prepared according to U.S. Pat. No. 5,697,856, had only a slight trans-gradient, less than 18 percent from edge to center. A fourth core, prepared according to U.S. Pat. No. 5,252,652, had a very large gradient, almost 65 percent from edge to center

TABLE 4

| | Invention Examples | | | Examples of Conventional Golf Balls | | | |
|---|---|---|---|---|---|---|---|
| | #1 | #2 | #3 | US#3239228 | US #5816944 US#5697856 | US#5252652 | US#4971329 US#4692497 |
| Chemical Constituents | | | | | | | |
| Polybutadiene (Shell, CARIFLEX BR1220) | 100 | 100 | 100 | | N/A | N/A | N/A |
| Polybutadiene (Firestone, 35 NF) | | | | 100 | N/A | N/A | N/A |

TABLE 4-continued

|  | Invention | | | Examples of Conventional Golf Balls | | | |
|---|---|---|---|---|---|---|---|
|  | #1 | Examples #2 | #3 | US#3239228 | US #5816944 US#5697856 | US#5252652 | US#4971329 US#4692497 |
| DMDS |  |  |  | 2.1 | N/A | N/A | N/A |
| Carbon Black (RA) |  |  |  | 15 | N/A | N/A | N/A |
| Wood Flour |  |  |  | 24 | N/A | N/A | N/A |
| Sulfur |  |  |  | 24 | N/A | N/A | N/A |
| Stearic Acid |  |  |  | 1 5 | N/A | N/A | N/A |
| Reogen |  |  |  | 15 | N/A | N/A | N/A |
| Vanox MBPC |  |  |  | 2 | N/A | N/A | N/A |
| Triethanolamine |  |  |  | 4 | N/A | N/A | N/A |
| Zinc oxide | 5 | 5 | 5 | 5 | N/A | N/A | N/A |
| Dicumyl peroxide | 3 | 1 9 | 2 |  | N/A | N/A | N/A |
| Zinc Diacrylate | 25 | 25 | 25 |  | N/A | N/A | N/A |
| Cis-Trans "Catalyst" |  |  |  |  | N/A | N/A | N/A |
| MnS |  | 0.82 |  |  | N/A | N/A | N/A |
| Ditolyldisulfide | 2.5 |  | 1.5 |  | N/A | N/A | N/A |
| $Cu_2S$ |  |  | 1 |  | N/A | N/A | N/A |
| Resultant Core Properties |  |  |  |  |  |  |  |
| Load(lbs) @ 10.8% Deflection 1.580" core | 165.5 | 191.4 | 191.8 | 61.1 | 325 | 390 | 480 |
| Coefficient of Restitution @ 125 ft/s | 0.783 | 0.777 | 0.785 | 0.599 | 0.779 | 0.805 | 0.775 |
| Hardness Shore C |  |  |  |  |  |  |  |
| Surface | 61 | 76 | 62 | 35 | 75 | 80 | 80.5 |
| Center | 52 | 52 | 59 | 30 | 70 | 61 | 66 5 |
| Dynamic Stiffness @ 0° C. (N/m) |  |  |  |  |  |  |  |
| Edge* | 25338 | 27676 | 28493 | 8312 | 62757 | 83032 | 72235 |
| Center | 20783 | 17390 | 27579 | 8361 | 61071 | 26264 | 50612 |
| Dynamic Stiffness @ –50° C. (N/m) |  |  |  |  |  |  |  |
| Edge* | 30265 | 34523 | 34455 | 19394 | 92763 | 109053 | 108242 |
| Center | 23022 | 20603 | 32195 | 18617 | 89677 | 28808 | 83183 |
| Dynamic Stiffness Ratio at –50° C./0° C. |  |  |  |  |  |  |  |
| Edge* | 119% | 125% | 121% | 233% | 148% | 131% | 150% |
| Center | 111% | 118% | 117% | 223% | 147% | 110% | 164% |
| Loss Tangent 0° C. |  |  |  |  |  |  |  |
| Edge* | 0 024 | 0 027 | 0 024 | 0 074 | 0 039 | 0 037 | 0 045 |
| Center | 0 025 | 0 023 | 0 023 | 0 073 | 0 033 | 0 025 | 0 043 |
| Loss Tangent –50° C. |  |  |  |  |  |  |  |
| Edge* | 0 098 | 0 084 | 0 097 | 0 183 | 0 142 | 0 119 | 0 099 |
| Center | 0 067 | 0 071 | 0 085 | 0 180 | 0 129 | 0 059 | 0 095 |
| % Trans BR Isomer Precure | 1.5 | 1.5 | 1.5 | 50 | N/A | N/A | N/A |
| % Trans BR Isomer Postcure |  |  |  |  |  |  |  |
| Surface | 55.8 | 8.4 | 45.5 | 50 | 30.2 | 24.6 | 1.5 |
| Center | 37.8 | 4.6 | 25.5 | 50 | 24.7 | 8.5 | 1.5 |
| % Trans Variation (Surf. - Center)/Surf. | 32% | 45% | 44% | 0% | 18% | 65% | 0% |

*Edge is measured approximately 5 mm from the exterior surface of the measured article.

Example 2

A Core Prepared from According to the Invention, Employing an Inorganic Sulfide Cis-to-trans Catalyst A core according to the present invention was created employing an inorganic sulfide compound as the cis-to-trans conversion catalyst. The resultant core properties clearly demonstrate the advantages of a golf ball core made according to the current invention as compared to example cores constructed with conventional technology. The components and physical characteristics are presented in Table 4.

The compressive load is approximately half of the compressive load of three cores constructed in accordance with U.S. Pat. Nos. 5,697,856, 5,252,652, and 4,692,497, while at the same time retaining roughly the same, and in some cases, a higher COR (resilience). The core made according to the current invention is soft, yet resilient (fast). The compressive load is greater than a core constructed in accordance with U.S. Pat. No. 3,239,228, but has a significantly higher COR. The core of U.S. Pat. No. 3,239,228 is very soft and very slow (low COR).

The percent change in dynamic stiffness from 0° C. to –50° C. was also measured at both the edge and center of the cores. The dynamic stiffness at both the edge and the center of the core of the current invention varied only slightly, less than 125 percent, over the temperature range investigated. The core made according to U.S. Pat. No. 3,239,228 varied over 230 percent, whereas the cores made according to other conventional technology, had a dynamic stiffness that varied by greater than 130 percent, and typically by as much as 150 percent, over the same temperature range.

The percent of trans-conversion was also measured at both the center and edge of the core prepared according to the current invention, and for cores prepared according to the same four patents mentioned above, allowing a trans-gradient to be calculated. The core according to the current invention had a trans-gradient of about 45 percent from edge to center. Two of the cores prepared in accordance with U.S. Pat. Nos. 3,239,228 and 4,692,497 had a zero trans-gradient. A third core, prepared in accordance with U.S. Pat. No. 5,697,856, had only a slight trans-gradient, less than 18 percent from edge to center. A fourth core, prepared in accordance with U.S. Pat. No. 5,252,652, had a very large gradient, almost 65 percent, from edge to center.

Example 3

A Core Prepared from According to the Invention, Employing a Blend of Organosulfur and Inorganic Sulfide Cis-to-trans Catalyst

A core according to the present invention was created employing a blend of organosulfur and inorganic sulfide compounds as the cis-to-trans conversion catalyst. The resultant core properties clearly demonstrate the advantages of a golf ball core made according to the current invention as compared to example cores constructed with conventional technology. The components and physical characteristics are presented in Table 4.

The compressive load is approximately half of the compressive load of three cores constructed in accordance with U.S. Pat. Nos. 5,697,856, 5,252,652, and 4,692,497, while at the same time retaining roughly the same, and in some cases a higher COR (resilience). The core made according to the current invention is soft, yet resilient (fast). The compressive load of the invention is greater than a fourth core constructed in accordance with U.S. Pat. No. 3,239,228, but has a significantly higher COR. The core constructed in accordance with U.S. Pat. No. 3,239,228 is very soft and very slow (low COR).

The percent change in dynamic stiffness from 0° C. to −50° C. was also measured at both the edge and center of the cores. The dynamic stiffness at both the edge and the center of the core of the current invention varied only slightly, less than 121 percent, over the temperature range investigated. The core made in accordance with U.S. Pat. No. 3,239,228 varied over 230 percent, whereas the cores made according to other conventional technology had a dynamic stiffness that varied by greater than 130 percent, and typically by as much as 150 percent, over the same temperature range.

The percent of trans-conversion was also measured at both the center and edge of the core prepared according to the current invention, and for cores prepared to the same four patents mentioned above, allowing a trans-gradient to be calculated. The core according to the current invention had a trans-gradient that about 44 percent from edge to center. For the core prepared according to the current invention, the pre- and post-cure trans-percentages was also measured to determine the effectiveness of that process. The percentage of polybutadiene converted to the trans-isomer ranged from almost 26 percent at the center to greater than 45 percent at the edge. Two of the cores prepared in accordance with U.S. Pat. Nos. 3,239,228 and 4,692,497 had a zero trans-gradient. A third core prepared in accordance with U.S. Pat. No. 5,697,856 had only a slight trans-gradient, less than 18 percent from edge to center. A fourth core, prepared in accordance with U.S. Pat. No. 5,252,652 had a very large gradient, almost 65 percent from edge to center.

Example 4

A Wound Ball Prepared According to the Invention

A dual core golf ball according to the present invention is prepared having a solid center, an intermediate layer of a tensioned material surrounding the solid center, and a multilayer cover disposed concentrically around the intermediate layer. The components and physical characteristics are presented below in Table 5.

TABLE 5

| | Ingredients (phr) |
|---|---|
| Center Composition | |
| CARIFLEX BR1220 | 100 |
| zinc diacrylate | 20 |
| dicumyl peroxide | 2.5 |
| zinc oxide | 39 |
| DTDS | 0.75 |
| Center Properties | |
| % trans Precure | 1.5 |
| % trans Postcure | 40 |
| load in lbs required (10.8% deflection) | 109 |
| Wound Layer Composition | |
| Cis-Polyisoprene thread | 100 |
| Inner Cover Composition and Properties | |
| Na SURLYN 8945 | 50 |
| Li SURLYN 7940 | 50 |
| Shore D hardness | 68 |
| thickness | 0.03 in |
| Outer Cover Composition and Properties | |
| MDI polyurethane | |
| thickness | 0.03 in |

A solid center was constructed for the ball of the present invention. The center was created from CARIFLEX BR-1220 polybutadiene as the starting material, the only difference being replacing the VAROX 802-40KE-HP peroxide (conventional technology) with a DTDS cis-to-trans catalyst of the current invention and dicumyl peroxide. This substitution allows a portion of the polybutadiene material to be converted to the trans-configuration during the molding process. The resulting solid center had an outside diameter of approximately 1.15 inches. The polybutadiene reaction product prepared thereby had a trans-isomer content of 40 percent compared to the 1.5 percent trans-isomer of conventional balls. An intermediate layer, having outside diameter of approximately 1.56 inches, was constructed by winding a thread material under tension around the solid center to form a wound core. The tensioned material includes conventional cis-polyisoprene thread.

Example 5

An Exemplary Ball Prepared According to the Invention

An exemplary ball can be prepared using CB23 polybutadiene rubber having about 50 Mooney viscosity, a DTDS cis-to-trans catalyst, 33 phr zinc diacrylate, and a tungsten filler to adjust the density of the center. The center can be about 1.4 inches in diameter. The center compression is desirably about 50 and has a deflection of about 4.26 mm under the 130 kg–10 kg test. A thread having a diameter of about 0.024 inches is then wound about the center at 800% elongation to form a wound center diameter of about 1.56 inches.

An inner cover is applied of 50% 8945 SURLYN sodium ionomer and 50% 7940 SURLYN lithium ionomer. Then blend has a hardness of 64 Shore D and the inner cover is desirably formed to a thickness of about 0.035 inches. The outer cover can be formed of an RC11b cast urethane material having a cured hardness of about 45 Shore D to a thickness of about 0.03 inches. RC11b urethane can be prepared from 1 equivalent of MDI/PTMEG polyol 2000 prepolymer having 6.0% NCO, 0.95 equivalent of Ethacure 300, and 3.5% HCC-19584 (a white color dispersion). RC11b has a material hardness of approximately 45 Shore D. ETHACURE 300 is commercially available from Albemarle Corporation of Baton Rouge, La. Conventional paints or other color stabilization packages may be applied over the cover of the golf ball. A suitable dimple pattern is a 392 dual dimple icosahedron pattern having a dimple volume of about 590 mm$^3$.

Examples 6–22

Balls of the Invention Having Wound, Solid Center Compared to Art

Several golfballs prepared according to the invention (Examples 11–17) were compared against several commercially available golf balls (Examples 6–10). The balls of the invention, Examples 11–17, were wound using 0.024 inch tensioned thread formed of a polyisoprene material to 1.575 inches diameter. The tensions varied and are indicated in the table below. The same SURLYN mantle as Example 10 was applied by molding to the cores of Examples 11–22 of the invention. The mantles were then buffed to remove excess material and provide a diameter of 1.62 inches, and a polyurethane material having a hardness of 45 Shore D was applied to form the outer cover layer on the balls of the invention.

| Ex. # | Wound Diam. (in) & Tension (g) | Zinc Diacrylate in thread (phr) | PGA Test: Init. Velocity (ft/s) | Compression | Cover Mat'l Hardness (Shore D) | CoR |
|---|---|---|---|---|---|---|
| 6 | N/A | N/A | 253.0 | 87 | 68 | 0.808 |
| 7 | N/A | N/A | 252.5 | 86 | 48 | 0.793 |
| 8 | N/A | N/A | 252.5 | 94 | 54 | 0.797 |
| 9 | N/A | N/A | 251.5 | 97 | 58 | 0.791 |
| 10 | N/A | N/A | 253.8 | 91 | 60 | 0.813 |
| 11 | 1.13"-400 g | 13 | 254.5 | 78 | 60 | 0.812 |
| 12 | 1.25"-500 g | 13 | 254.5 | 70 | 60 | 0.815 |
| 13 | 1.25"-900 g | 8 | 254.5 | 74 | 60 | 0.812 |
| 14 | 1.35"-900 g | 18 | 253.5 | 75 | 60 | 0.807 |
| 15 | 1.35"-900 g | 13 | 253.0 | 60 | 60 | 0.800 |
| 16 | 1.45"-1200 g | 21 | 252.5 | 77 | 60 | 0.803 |
| 17 | 1.45"-1200 g | 13 | 250.5 | 38 | 60 | 0.793 |

The golf balls of Examples 11–17 prepared according to the invention exhibit a lower ball compression while retaining roughly the same initial velocity, cover material compression, and CoR as the commercial golf balls of Examples 6–10. It will be seen in the golf balls prepared according to the invention that using equivalent amounts of zinc diacrylate in the center of balls having increasing diameter centers can advantageously provide a decrease in compression of the ball without adversely impacting the high CoR values of the ball.

Examples 18–25

Fluid-Filled Golf Balls of the Invention Compared to Prior Art

Conventional golf balls of Examples 18–23 were prepared or obtained and compared to golf balls of the invention of Examples 24–25. Example 24 was prepared as noted below and having an inner cover layer of 1.62" and a thread and tension of Example 22. Example 25 was prepared as noted below and having an inner cover layer of 1.62" and a thread and tension of Example 23. The balls of Examples 24–25 were then each covered with a urethane formulation for Example 20.

| Ex. # | Wound Diam. (in) & Tension (g) | PGA Test: Init. Velocity (ft/s) | Compression | Cover Mat'l Hardness (Shore D) | CoR |
|---|---|---|---|---|---|
| 18 | N/A | N/A | 84 | 66 | 0.806 |
| 19 | N/A | N/A | 87 | 46 | 0.801 |
| 20 | N/A | 252.5 | 88 | 56 | 0.805 |
| 21 | N/A | N/A | 95 | 57 | 0.795 |
| 22 | N/A | N/A | 87 | 67 | 0.803 |
| 23 | N/A | N/A | 71 | 64 | 0.800 |
| 24 | 1.55" | 251.3 | 81 | 54 | 0.793 |
| 25 | 1.565" | 251.9 | 77 | 58 | 0.795 |

Fluid-filled balls prepared according to the invention have a generally lower compression than the commercial golf balls of Examples 18–23.

Examples 26–34

Wound Golf Balls of the Invention Compared to Prior Art

Conventional golf balls of Examples 26–30 were prepared or obtained and compared to golf balls of the invention of Examples 24–25. Examples 31–34 of the invention were prepared with a 1.39 inch core including CB23 rubber and tungsten filler, and were covered with a wound layer to a diameter of 1.55 inches using the same materials and winding specifications as the Titleist DT Spin golf ball, which ball is commercially available. Two layers of cover material were then applied to each wound core using the same cover material as Example 28, i.e., an inner cover layer of a urethane material having an outer diameter of 1.62 inches and an outer cover layer of a conventional ionomer blend having an outer diameter of about 1 68 inches.

Example 31 according to the invention was prepared as noted below having a cover material hardness of 38 Shore D. Example 32 according to the invention was prepared having a cover material hardness of 38 Shore D and the core included a material that converted some of the cis-isomers in the CB23 polymer to trans-isomers during the core formation process. Example 33 had a cover material hardness of 45 Shore D. Example 34 had a cover material hardness of 45

Shore D and included the same material of Example 32 to convert some of the cis-isomers to trans-isomers in the CB23.

| Ex. # | Compression | Cover Mat'l Hardness (Shore D) | CoR |
|---|---|---|---|
| 26 | 89 | 67 | 0.810 |
| 27 | 92 | 47 | 0.799 |
| 28 | 93 | 56 | 0.804 |
| 29 | 100 | 55 | 0.793 |
| 30 | 95 | 49 | 0.797 |
| 31 | 82 | 57 | 0.803 |
| 32 | 73 | 55 | 0.799 |
| 33 | 83 | 57 | 0.804 |
| 34 | 74 | 58 | 0.800 |

The golf balls having softer cover materials prepared according to the invention have a generally lower compression than the commercial golf balls of Examples 26–30.

Examples 35–41

Polyether Urea Wound Golf Balls Compared to Prior Art

Commercially available conventional golf balls of Examples 35–37 were compared to golf balls of the invention of Examples 38–41. Examples 38–39 according to the invention had a 1.400 inch core having a compression of 75 before the winding was applied. Examples 40–41 according to the invention had a 1.470 inch core having a compression of 79 before the winding was applied. Examples 38–41 of the invention were then further prepared with a wound layer of a polyetherurea thread material having an outer diameter of the wound layer of 1.550 inches applied and then covered with two layers of cover material using the same cover material as Example 37, i.e., an inner cover layer of a urethane material having an outer diameter of 1.62 inches and an outer cover layer of a conventional ionomer blend having an outer diameter of about 1.68 inches.

| Ex. # | Compression | Cover Mat'l Hardness (Shore D) | CoR |
|---|---|---|---|
| 35 | 89 | 67 | 0.800 |
| 36 | 89 | 48 | 0.793 |
| 37 | 94 | 57 | 0.809 |
| 38 | 94 | 55 | 0.808 |
| 39 | 85 | 55 | 0.815 |
| 40 | 94 | 55 | 0.814 |
| 41 | 88 | 55 | 0.815 |

The golf balls prepared according to the invention had a generally higher CoR while retaining the same compression and cover material hardness as the conventional golf balls of Examples 35–37.

While it is apparent that the illustrative embodiments of the invention herein disclosed fulfills the objectives stated above, it will be appreciated that numerous modifications and other embodiments may be devised by those skilled in the art. For example, the present invention could use more than one thread where the threads are chemically, physically or mechanically distinct from each other. Therefore, it will be understood that the appended claims are intended to cover all such modifications and embodiments which come within the spirit and scope of the present invention.

What is claimed is:

1. A golf ball comprising:

a center;

a wound layer surrounding the center;

an inner cover layer surrounding the wound layer and having a first hardness; and an outer cover layer formed of a thermoset castable reactive liquid material surrounding the inner cover layer and having a second hardness less than the first hardness and having a thickness of less than about 0.05 inches.

2. The golf ball of claim 1, wherein the inner cover is less than about 0.05 inches.

3. The golf ball of claim 1, wherein the inner cover comprises at least one ionomer.

4. The golf ball of claim 1, wherein the thermoset castable reactive liquid material comprises a thermoset polyurethane composition.

5. The golf ball of claim 4, wherein the thermoset polyurethane composition comprises at least one isocyanate and at least one curing agent.

6. The golf ball of claim 5, wherein the curing agent comprises a polyamine curing agent, a polyol curing agent, or a mixture thereof.

7. The golf ball of claim 6, wherein the curing agent comprises a polyamine.

8. The golf ball of claim 6, wherein the curing agent comprises at least one polyol.

9. The golf ball of claim 1, wherein the inner cover and outer cover layer have a combined thickness of less than about 0.07 inches.

10. A golf ball comprising:

a center comprising a polybutadiene having a molecular weight of greater than about 300,000 and a resilience index of at least about 40;

a wound hoop stress layer surrounding the center, having an outer diameter of at least about 1.51 inches, and disposed between the center and the cover, wherein the hoop stress layer comprises a glass, polyamide, aromatic polyamide, carbon, or metal fiber having a tensile strength of at least about 250 kpsi and a modulus of at least about 10,000 kpsi; and a cover having at least one layer disposed around the wound hoop stress layer, the cover comprising a polyurethane composition formed from a prepolymer having less than 7.5 percent by weight unreacted isocyanate groups.

* * * * *